DATA RETRIEVAL AND COUPLING SYSTEM

Filed Nov. 3, 1961 11 Sheets-Sheet 1

INVENTORS
GEORGE W. HERNAN &
STANLEY H. HUNKINS
BY Millman and Jacobs
ATTORNEYS

DATA RETRIEVAL AND COUPLING SYSTEM

INVENTORS
GEORGE W. HERNAN &
STANLEY H. HUNKINS
BY Millman and Jacobs
ATTORNEYS

DATA RETRIEVAL AND COUPLING SYSTEM

Filed Nov. 3, 1961 11 Sheets-Sheet 3

INVENTORS
GEORGE W. HERNAN &
STANLEY H. HUNKINS
BY Millman and Jacobs
ATTORNEYS

DATA RETRIEVAL AND COUPLING SYSTEM

Filed Nov. 3, 1961 11 Sheets-Sheet 4

INVENTORS
GEORGE W. HERNAN &
STANLEY H. HUNKINS
BY Millman and Jacobs
ATTORNEYS

DATA RETRIEVAL AND COUPLING SYSTEM

Filed Nov. 3, 1961 11 Sheets-Sheet 5

INVENTORS
GEORGE W. HERNAN &
STANLEY H. HUNKINS
BY Millman and Jacobs
ATTORNEYS

DATA RETRIEVAL AND COUPLING SYSTEM

Filed Nov. 3, 1961 11 Sheets-Sheet 6

INVENTORS
GEORGE W. HERNAN &
STANLEY H. HUNKINS
BY Millman and Jacobs
ATTORNEYS

DATA RETRIEVAL AND COUPLING SYSTEM

Filed Nov. 3, 1961 11 Sheets-Sheet 7

INVENTORS
GEORGE W. HERNAN &
STANLEY H. HUNKINS
BY Millman and Jacobs
ATTORNEYS

DATA RETRIEVAL AND COUPLING SYSTEM

Filed Nov. 3, 1961

INVENTORS
GEORGE W. HERNAN &
STANLEY H. HUNKINS
BY Millman and Jacobs
ATTORNEYS

| TIMING P-1 | INDEX I | QUADRANT | 32 STOCK IDENTIFICATION CODE | | | | | LOW 34 | | | HIGH 36 | | | LAST | | | VOL. | | | BID 654 | | | ASK 656 | | |
|---|---|---|---|---|---|---|---|---|---|---|---|---|---|---|---|---|---|---|---|---|---|---|---|---|---|
| | | | | | | | | 1 | 2 | 3 | 1 | 2 | 3 | 1 | 2 | 3 | 1 | 2 | 3 | 1 | 2 | 3 | 1 | 2 | 3 |
| X | | | | | | | | | | | | | | | | | | | | | | | | | |
| X | X | X | 1 | 2 | 3 | 4 | 5 | | | | | | | | | | | | | | | | | | |
| X | | | 6 | 7 | 8 | 9 | 10 | | | | | | | | | | | | | | | | | | |
| X | | | 11 | 12 | 13 | 14 | 15 | | | | | | | | | | | | | | | | | | |
| X | | | 16 | 17 | 18 | 19 | 20 | | | | | | | | | | | | | | | | | | |
| X | X | | | | | | | 1 | 5 | 9 | 1 | 5 | 9 | 1 | 5 | 9 | 1 | 5 | 9 | 1 | 5 | 9 | 1 | 5 | 9 |
| X | | | | | | | | 2 | 6 | 10 | 2 | 6 | 10 | 2 | 6 | 10 | 2 | 6 | 10 | 2 | 6 | 10 | 2 | 6 | 10 |
| X | | | | | | | | 3 | 7 | 11 | 3 | 7 | 11 | 3 | 7 | 11 | 3 | 7 | 11 | 3 | 7 | 11 | 3 | 7 | 11 |
| X | | | | | | | | 4 | 8 | 12 | 4 | 8 | 12 | 4 | 8 | 12 | 4 | 8 | 12 | 4 | 8 | 12 | 4 | 8 | 12 |
| | | | | | | | | | | | | | | | | | | | | | | | | | |

INVENTORS
GEORGE W. HERNAN &
STANLEY H. HUNKINS
BY Millman and Jacobs
ATTORNEYS

DATA RETRIEVAL AND COUPLING SYSTEM

Filed Nov. 3, 1961 11 Sheets-Sheet 10

INVENTORS
GEORGE W. HERNAN &
STANLEY H. HUNKINS
BY Millman and Jacobs
ATTORNEYS

Oct. 25, 1966 G. W. HERNAN ETAL 3,281,788

DATA RETRIEVAL AND COUPLING SYSTEM

Filed Nov. 3, 1961 11 Sheets-Sheet 11

INVENTORS
GEORGE W. HERNAN &
STANLEY H. HUNKINS
BY Millman and Tawks
ATTORNEYS 3,281,788
DATA RETRIEVAL AND COUPLING SYSTEM
George W. Hernan, Haddonfield, and Stanley H. Hunkins, Merchantville, N.J., assignors to Ultronic Systems Corporation
Filed Nov. 3, 1961, Ser. No. 149,913
18 Claims. (Cl. 340—152)

This invention relates to data storage and retrieval systems and particularly to a system for retrieving information about stock transactions from a data storage system and supplying the information to a large number of information requesting units.

In the copending patent application of Sinn and Hernan, Ser. No. 113,689, filed May 31, 1961 entitled "Data Retrieval System," which application has now been abandoned and continuing application Serial No. 484,784, filed August 20, 1965, a data storage and retrieval system is described in which digital stock transaction information is stored on a magnetic drum. A number of information requesting units or consoles are associated with this equipment and may be located in a stock broker's office or the like. A plurality of such consoles are connected via a terminal switching unit and a communications system to a data retriever unit and, thereby, to the data storage. The requested information is obtained from storage by the data retriever unit and transmitted back via the terminal switching unit to the requesting console. In this manner, a large number of consoles may obtain access to the data storage unit for the desired information. A plurality of such arrangements may be coupled to the memory so that pluralities of consoles in different remote locations may be serviced by the same data storage unit. In addition, a plurality of consoles more closely positioned to the data storage system may obtain access to the data storage in a similar fashion by means of an output logic unit also connected to the data storage unit. With this system, the information requested by the operator of any one console is made available to it almost immediately upon selection of the desired stock and category of information. Thereby, a large number of console operators may gain access to the central storage system substantially simultaneously and from remote locations.

It is an object of this invention to provide a new and improved data retrieval and storage system.

Another object is to provide a new and improved data retrieval and storage system for supplying current information about stock transactions.

Another object is to provide a new and improved data retrieval system in which a large number of requesting units may be connected to a data storage to obtain information therefrom and in which these requesting units may be connected to and disconnected from the system without affecting the operation thereof.

The foregoing and other objects of this invention, the features thereof, as well as the invention itself, may be more fully understood from the following description when read together in connection with the accompanying drawing, in which:

FIG. 1 is a schematic block diagram of an information storage and retrieval system embodying this invention;

FIGS. 2A, B, and C are schematic block and logic diagrams of portions of a data collector unit that may be used in connection with the system of FIG. 1;

Figures 2B, 2C:
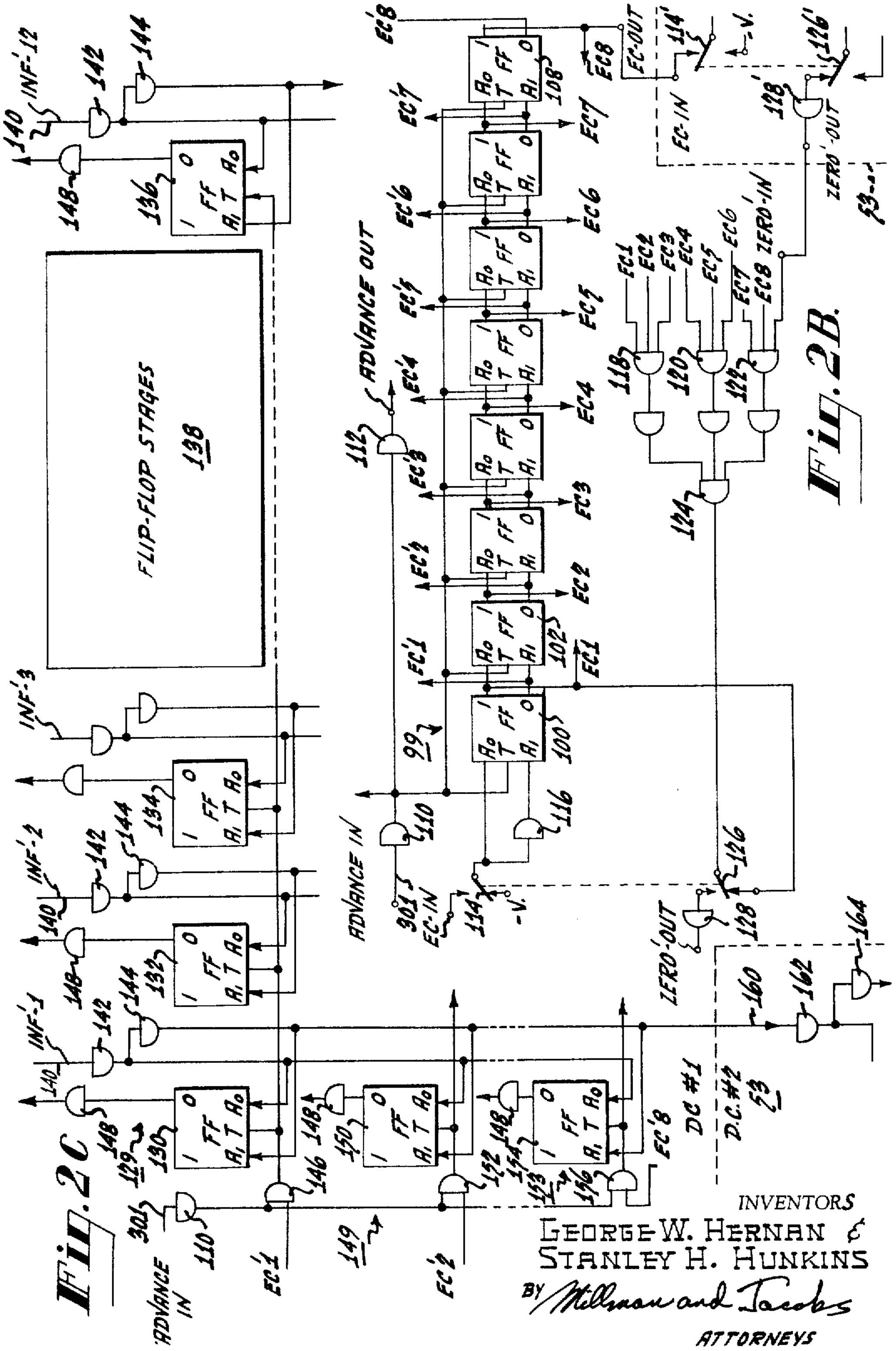
Figures 12A, 12B:
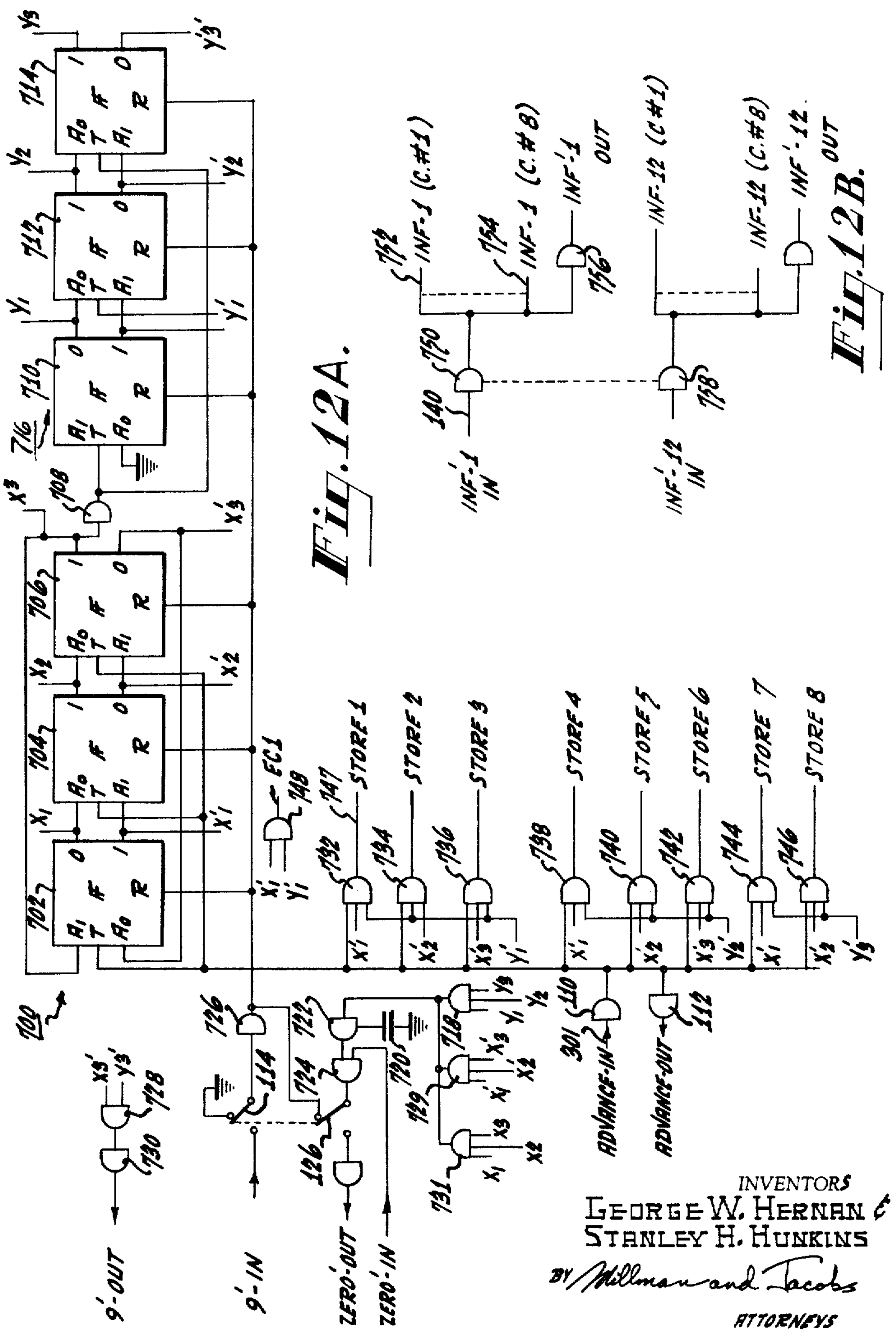
Figure 13:
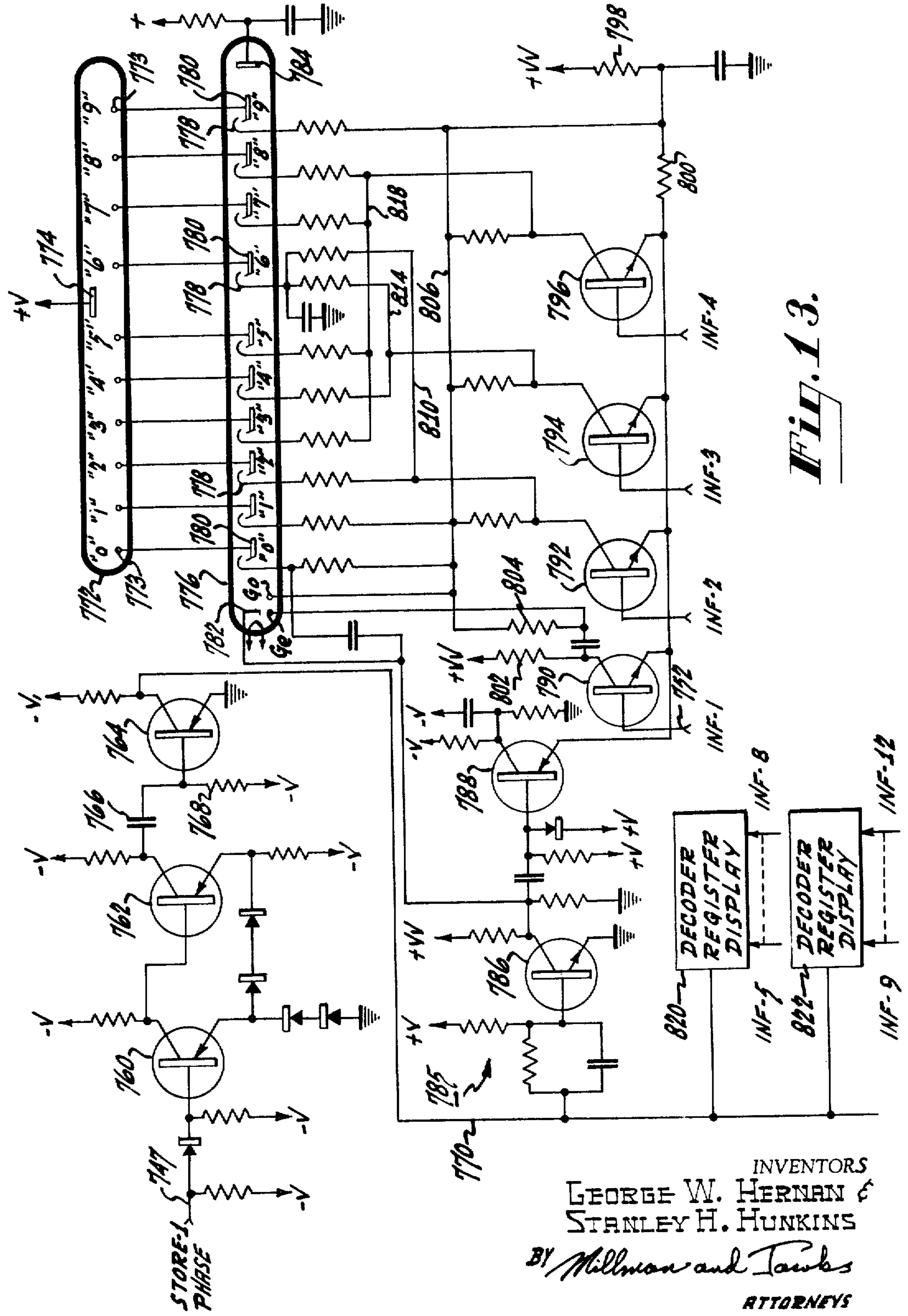

FIGS. 12A and 12B, taken together, are schematic block and logic diagrams of a modified form of the data collector of FIGS. 2B and C; and FIG. 13 is a schematic circuit diagram of a portion of a console display system for use with the data collector of FIG. 12.

In the drawing corresponding parts are referenced by similar numerals throughout.

*General system*

Figure 1:
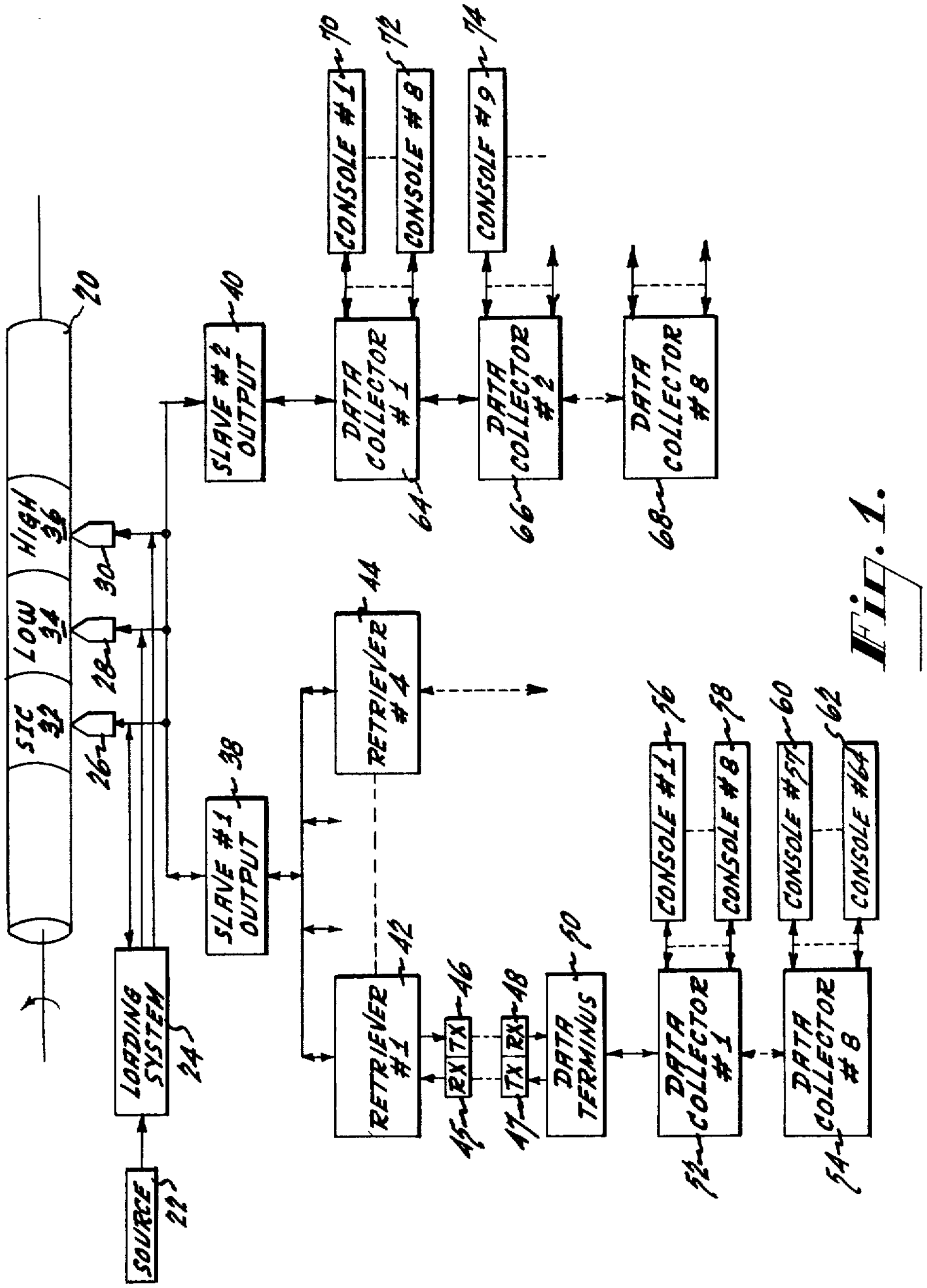

In FIG. 1 a storage drum memory 20 receives information from a source 22 via a loading system, and control 24 via read-write recording heads and amplifiers 26, 28, and 30 respectively associated with storage bins 32, 34, 36 on the recording drum 20, which bins 32, 34, and 36 store information related to the stock identification code (SIC) and associated High and Low stock transaction prices. Other bins on the drum 20 may be used to store associated information such as Last price, Closing price, Volume of sales, Number of transactions, Time of transaction, Stock earnings, and Bid and Ask prices. A suitable loading system of this sort is described in the copending application of Sinn, "Information Storage System," Ser. No. 108,120, filed May 5, 1961.

Connected to the read-write recording heads and amplifiers 26, 28, and 30 are a plurality of slave output units 38 and 40; additional such output units may be provided. The first slave output 38 is connected to four retriever units 42, 44 which, in turn, are connected to receiver-transmitter communication units 45, 46. The receiver (R*x*) 45 and transmitter (T*x*) 46 are respectively connected via communication lines to a T*x* 47 and R*x* 48 which, in turn, are connected to a data terminus unit 50. The data terminus unit 50, in turn, is connected to a series of data collector (DC) units 52 and 54, eight of which are shown connected in series. Connected to each data collector 52 and 54 (in the illustrated form of the invention) are up to eight console units 56, 58 and 60, 62; #1 to #8 consoles 56, 58 are connected to DC–1, and #57 to #64 consoles 60 and 62 are connected to DC–8. This invention is not limited to any particular number of slave output, retriever, terminus, collector, or console units in the system; and a lesser or greater number may be incorporated to meet various requirements.

Signal transmission through this system is generally by way of binary signals in the form of high and low voltage levels respectively representing the binary digits "0" and "1." The communication system 45–48 may be of any suitable type employing such signals or any other appropriate form of signals and especially adapted for long distance transmission; an appropriate form of this system which is commercially available is a dataphone communication system for transmitting digital information via a telephone line using a frequency modulation system. For example, signals of two different frequencies are generated and transmitted in response to the different voltage levels which represent the binary digits "0" and "1." The Tx units 46, 47 convert the digital voltage levels from the retriever 42 and data terminus 50 to signals of the two different frequencies, and the Rx units 45, 48 reconvert the transmitted signals back to the appropriate voltage levels. Each of the other retriever units represented by the unit 44 is similarly connected via transmission and receiver units to a data terminus and, via data collectors, to pluralities of console units in a similar fashion.

In operation, the console units 56–62 are successively connected via the data collectors 52, 54 to the data terminus 50 to supply a request for stock transaction information relevant to a certain stock. Each console unit supplies a stock identifier code SIC and also identifies the particular category of transaction information desired. The signals representing this request are transmitted via the data terminus and Tx 47 to Rx 45 and to the #1 retriever 42. The latter unit 42, in turn, transmits this information to a slave output 38 which obtains access to an appropriate part of the drum 20 in which the SIC and requested information category are stored. This information is obtained by the slave output 38 and transmitted back via retriever 42, Tx 46, Rx 48 to the data terminus 50 which, in turn, supplies the reply message via one or more of the data collectors to the requesting console.

A plurality of slave outputs similar to the unit 38 may be connected to the drum storage 20 via the read-write heads and amplifiers 26–30; each such slave output would be connected independently via similar retriever, communication, data terminus, and data collector units to the consoles, and the operation is similar to that described above.

In addition, a slave output 40 connected to the recording heads and amplifiers 26–30 is directly connected to a series of data collectors 64, 66, and 68 which, in turn, are connected to pluralities of eight consoles 70, 72, 74, etc. In operation, any one of the consoles 70 and 72, connected to the data collectors 64–68, may obtain access via the slave output 40 to the requested portion of the drum storage 20 to obtain the desired information in a manner similar to that described above. The consoles 70, 72, and 74 may be connected relatively close to the storage unit 20 so that the coupling system of a retriever, communication units, and a data terminus are not required. The slave outputs 38 and 40 are generally the same in construction and may have connected thereto an appropriate combination of retrievers or, alternatively, the data collectors directly.

The source 22 of the information may contain a master unit including a magnetic drum, similar to the drum 20, which is kept in updated condition. The master unit of the source 22 is used to maintain updated the slave memory 20 and any other slave memories (not shown) by means of loading systems 24.

*System logic and circuits*

Figure 6:
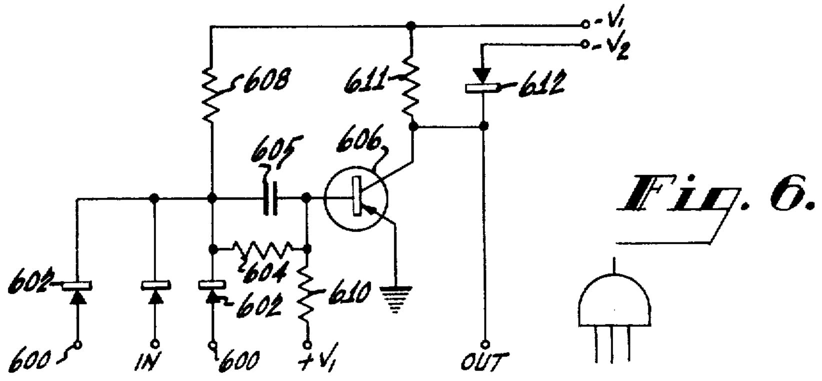
FIG. 6 is a schematic circuit diagram of a logical unit that may be used in the schematic block diagrams of FIGS. 1–5.

The system logic described hereinafter is based on NOR logic. A suitable form of NOR circuit that may be used is shown in FIG. 6. Three input terminals 600 are connected via separate diodes 602 and a parallel combination of resistor 604 and capacitor 605 to the base of a transistor 606 connected in the common-emitter mode. Resistors 608 and 610 on either side of the resistor 604 form a voltage divider network which tends to forward bias the base-emitter path of transistor 606. A collector resistor 610 and a clamping diode 612 form the output circuit of the transistor, the output being taken at the collector of the transistor with the diode 612 determining the output voltage when the transistor is not conducting.

In operation, the input voltages applied to the terminals 600 are either ground potential or —V2, which respectively represent the binary digits 1 and 0. If any one of the input terminals 600 is at ground potential, the transistor 606 is biased off, and the output collector voltage is —V2. Thus, the circuit of transistor 606 functions to logically invert the input signal. If all of the input terminals 600 are at —V2, the diodes 602 decouple these inputs from the transistor base, and the voltage divider network 608, 604, 610 function to render the transistor 606 conductive. The output voltage is substantially ground potential when the transistor 606 conducts due to the small voltage drop in the emitter collector path. Thus, the NOR circuit operates as an "and" gate and inverter for low voltage signals and as a buffer and inverter for high voltage signals.

Figure 7:
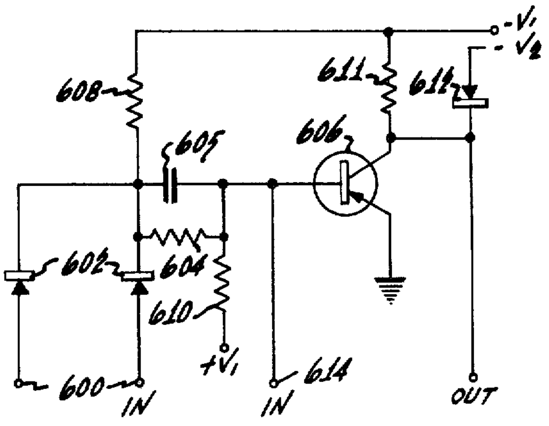
FIG. 7 is a schematic circuit diagram of another form of logical unit that may be used in the block diagrams of FIGS. 1–5.
Figure 7:
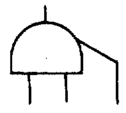

In FIG. 7 a modified form of the NOR circuit of FIG. 6 is shown, and corresponding parts are referenced by similar numerals. In this circuit an additional input terminal 614 is connected directly to the base of the transistor 606. The operation of the circuit with the input signals applied to the terminals 600 is generally the same; however, a ground input signal at terminal 614 (generally applied via a diode, not shown or via a pulse steering gate 618, described below) overrides the effect of the other inputs and controls the state of the transistor 606. When any of the inputs of the circuits of FIGS. 6 and 7 are open-circuited or at a floating voltage momentarily, they are effectively disconnected.

The circuits of FIGS. 6 and 7 are cascaded in logical nets with the output terminal of one NOR circuit being connected to the input terminal of a succeeding NOR circuit. These circuits are used with different numbers of inputs, and with a single input they function as inverter amplifiers. The symbols for these circuits used in the logic diagrams are shown in the figures. Where a plus symbol (+) is added to the symbol, the effective logic operation is that of OR, but the circuit is unchanged. Where these circuits are used to drive a large load, a plurality thereof may be connected in parallel.

Figure 8:
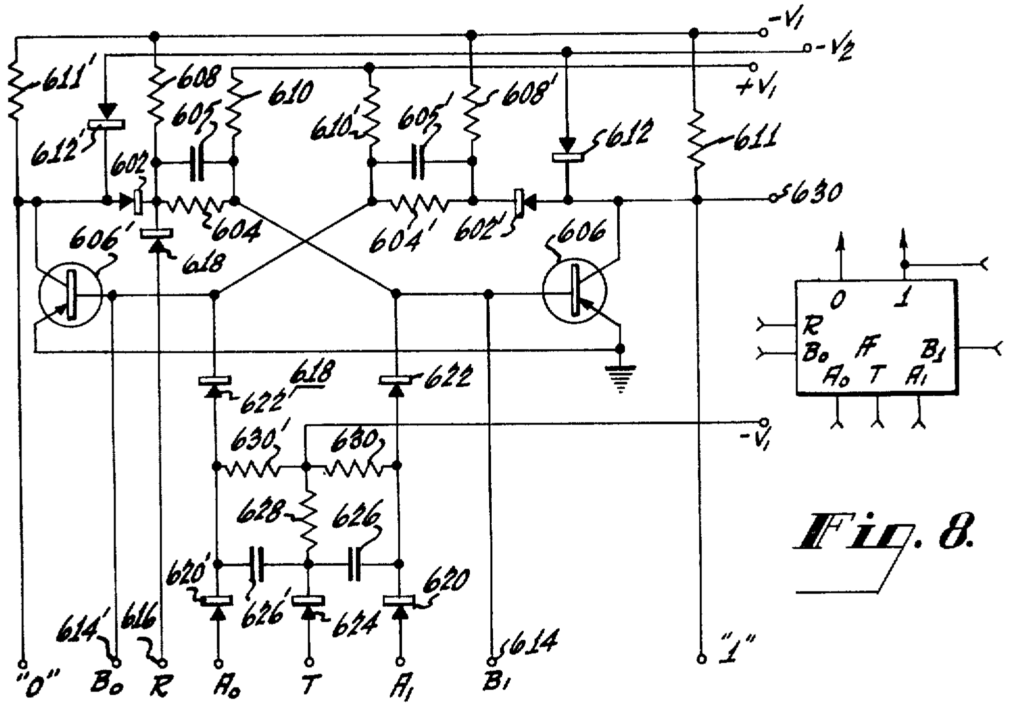
FIG. 8 is a schematic circuit diagram of a flip-flop unit that may be used in the block diagrams of FIGS. 1–5.

In FIG. 8 a flip-flop circuit is shown that is formed by two NOR circuits of the type shown in FIG. 7 connected in a regenerative configuration. Parts of one of the transistor circuits are referenced by the same numerals as in FIG. 7, and those of the other circuit are referenced by the same numerals with the addition of a prime ('). The circuit of transistor 606 is referenced as the 1-side of the flip-flop, and the circuit of transistor 606' is represented as the 0-side of the flip-flop. The collector of transistor 606 is connected via diode 602' to the base of transistor 606', and the collector output of transistor 606' is connected via the input diode 602 to the base of transistor 606. The circuit operates as a bistable multivibrator so that when one transistor is turned off, the other transistor is turned on, and vice-versa.

In addition to the circuit elements described thus far for the flip-flop of FIG. 8, a reset input terminal 616 is connected via diode 618 to tht junction of diode 602 and resistor 604. Thus, when a ground level reset signal is applied to the terminal 616, the 1-transistor 606 is turned off, and the 0-transistor 606' is turned on. In the reset condition, the output voltages are low at the 1-output terminal and high at the 0-output terminal. In the set condition of the flip-flop, the opposite output voltage conditions exist.

The input circuit of the flip-flop includes a pulse steering network 618. An A–1 input terminal is connected via a diode 620 (used for isolation) to a gating diode 622 which is connected to the base of the 1-transistor 606. A trigger input 624 is connected via capaictor 626 to the junction of the diodes 620 and 622. Resistor 628 at the junction of diode 624 and capacitor 626 is connected to —V1 as is a resistor 630 connected to the junction of the diodes 620 and 622. The resistor 628 provides a leakage path for the capacitor 626, and resistor 630 and capacitor 626 form a differentiating network. A similar network is provided from the A–0 input terminal with corresponding parts being referenced by the same numerals together with the addition of a prime ('); the trigger input and diode 624 and resistor 628 are common to both the A–0 and the A–1 circuits.

In operation, if the A–0 input is at ground and the A–1 input is a negative voltage, the gating diode 622' is essentially at zero bias, and the diode 622 is heavily back biased. A positive trigger pulse applied to the T-terminal is passed by the capacitor 626' and the diode 622' to turn off the transistor 606' and set the flip-flop in the 1-state. This same trigger pulse finds the diode 622 back biased and is not sufficient to overcome that bias so that there is no effect directly on the 1-transistor 606. With the input voltages reversed so that the A–0 terminal is at negative voltage and the A–1 terminal is at a positive voltage, the trigger input is steered through diode 622 to turn off the 1-transistor and reset the flip-flop to the 0-state.

The A–1 and A–0 inputs are hereinafter briefly referred to as the 1-inputs and 0-inputs, respectively.

In addition to the inputs noted above, B–0 and B–1 inputs are provided in the form of the input terminals 614' and 614. These inputs provide alternative access to control the state of the flip-flop. Generally, a pulse steering gate 618 (or half of one) is used at the B–0 and B–1 inputs. Moreover, an input terminal 630 is connected directly to the collector of the transistor 606 (the 1-output); thereby, when the flip-flop is in the 0-state with 0-transistor 606' conducting, a positive pulse applied to the terminal 630 is effective to reverse the state of the flip-flop to place it in the 1-state. Thus, an output of the flip-flop may also be used as an input terminal. A similar input terminal (not shown) connected to the collector of the 0-transistor 606' (the 0-output) is used to reset the flip-flop to the 0-state.

To summarize, the flip-flop is reset to the 0-state by a ground signal at the R-input, B–1 input, or 0-output or at the 1-input together with a trigger pulse at the T-input. It is set to the 1-state by a ground signal at the B–0 input, the 1-output, or at the 0-input together with a trigger pulse. When reset, the 1- and 0-outputs are respectively at low and high voltage levels; when set, the 1- and 0-outputs are respectively high and low.

The operation of the pulse steering gate 618 is such that the application of ground potential to the A–0 or A–1 terminals does not affect the state of the flip-flop in the absence of a trigger pulse applied to the T-terminal. That is, the A–0 and A–1 input terminals are driven from the collector of a NOR transistor (FIG. 6 or 7), and the small voltage drops in the emitter-collector path of such a transistor in addition to the voltage drops in the diodes 620' and 622' are such that the conducting transistor 606' remains forward biased. The decoupling diode 620' is effective to isolate the transistor of the driving circuit from the effect of a trigger pulse passed by the capacitor 626'; moreover, this diode 620' prevents any loading by the driving circuit of the trigger pulse passed by the capacitor 626'. Accordingly, the pulse steering gate 618 is effective to control the state of the flip-flop in accordance with the voltages applied to the A–0 and A–1 input terminals with rapid operation thereof.

The flip-flop of FIG. 8 may be converted to a binary counter stage by connecting the 0- and 1-output terminals to the A–0 and A–1 input terminals, respectively. Thereby, trigger pulses are effective to turn off the conducting transistor and reverse the state of the flip-flop, and successive such trigger pulses are thereby counted by the flip-flop in binary fashion. By cascading such counter stages (with one connected to the T-input of the next), various binary counters may be provided. Also, only one of the output terminals (say, the 0-terminal) may be connected to the associated input terminal (A–0); in that case, after having been reset, the next trigger pulse sets the flip-flop.

The R-input of the flip-flop may be connected directly to ground to automatically reset the flip-flop in the absence of a trigger pulse. With the 0-input also at ground, a trigger pulse reverses the state of the flip-flop momentarily during its duration. Thereby, the flip-flop may be used as a pulse-forming circuit.

The binary signals are generally in the form of voltage levels. A high (ground) level represents "1" and a low, negative level represents "0"; these signals are also used generally to represent, respectively, a command and the inverse form of the command. The inverse form of a signal identifier is represented by the addition of a prime (') thereafter. Any inverted signal that is present is a negative voltage level. Any signal is converted to its inverted form, and vice versa, by a gate or an inverter.

These particular circuits and signal forms are illustrated as a preferred form of this invention; however, other known circuits, logic types, and signals may be utilized with features of this invention.

Various forms of magnetic recording may be used, as well as various forms of read-write heads and amplifiers; suitable forms are known in the art. This invention is not limited in its scope to magnetic drum storage; other memories may be used. For example, a cyclic recirculating delay line storage may be used with this invention.

*Consoles and data collectors*

The consoles and data collectors are similarly constructed and operate similarly (except as otherwise noted).

Figures 2A, 11:
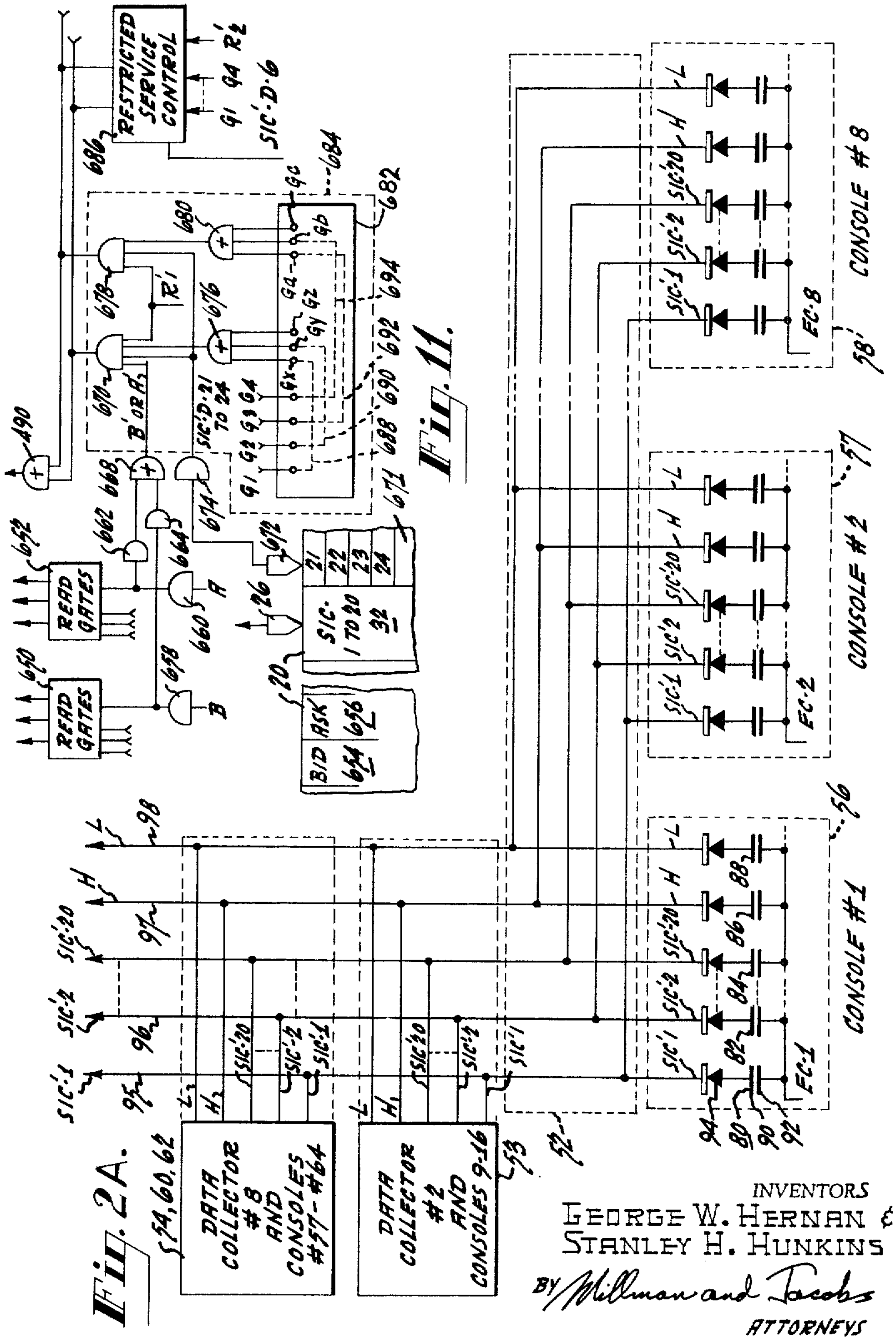
FIG. 11 is a schematic block and logic diagram of a modification of the slave unit of FIG. 5.

In FIG. 2A, three consoles 56, 57, and 58 of the eight consoles associated with #1 data collector 52 are shown. These consoles 56–58 are generally the same in construction (and the same as the other consoles of the system); #1 console 56 includes a plurality of switches 80–88 each including two contact 90 and 92. Each of the contacts 92 of these switches is connected to a line to receive an enable-console (ground) signal which for #1 console is represented as EC–1. The other switch contact 90 is connected to the anode of a diode 94, the cathode of which is connected as an output line from the console representing SIC'–1 for switch 80 (the inverse (') signal identifier is used for consistency with the remainder of the system; that is, ground voltage may be assumed to represent "0," and a negative voltage, "1"). In a similar fashion, switch 82 is connected to a diode to the output line SIC'–2, and switch 84 is connected to a diode to the output line SIC'–20. Seventeen other such switches and associated diodes are connected to lines SIC'–3 to –20 as indicated by the dotted lines. In addition, switches 86 and 88 have their upper contacts connected via diodes to H and L selector lines, respectively. Additional switches, diodes, and other selector lines (not shown) as required by the user are connected in a similar fashion; these switches, etc. are not illustrated for simplicity.

The switches 80–88 are closed or left open under manual control of an operator via any suitable mechanism. An appropriate form of switch mechanism is described in the copending application of Sinn, "Data Selection System," Ser. No. 113,690, filed May 31,1961.

In DC #1 corresponding output lines of consoles 56–58 are connected together; that is, the SIC'–1 lines are connected together, the SIC'–2 lines are connected together, etc., the H lines are connected together, the L lines are connected together, etc.

In a similar fashion, in DC #2 and associated consoles 53, the SIC' lines and the category lines H and L are similarly connected together to common lines, and these common lines are connected to the associated lines from DC–1. DC–8 and associated consoles are constructed in a similar fashion with similarly connected output lines. Thus, the SIC′–1 lines of all of the data collectors are connected together to a common SIC′–1 line 95, the SIC′–2 lines of all the data collectors are connected together to a common SIC′–2 line 96, and so on for each of the SIC′ lines; similarly, the category lines H of each of the data collectors are connected together to a common H selector line 97, the L lines are connected together to a common L selector line 98, and so on for each of the other category selectors.

In FIG. 2B the sequency control, or commutator, for supplying the enable signals EC–1 through EC–8 is shown; it includes a shift register 99 that comprises eight flip-flops 100, 102, 108. The 1-output and 0-output of each flip-flop is connected to the 0-input and 1-input, respectively, of the succeeding flip-flop. The T-input to each flip-flop receives an inverted command pulse, Advance, which pulse (on the trailing edge thereof, when it returns to ground) enables the input of the flip-flop to accept the output levels of the preceding flip-flop. Thereby, the state of each flip-flop is shifted to the succeeding one.

The Advance signal is received by the data collector at an Advance-in line 301, inverted in an inverter 110, and supplied as Advance′ to the T-inputs of flip-flops 100, 102, 108. The output of inverter 110 is also inverted by inverter 112 to supply an Advance-out line with the Advance signal for the succeeding data collector. The first flip-flop 100 of the shift register 99 is set to the 1-state by an enable-console signal (EC) which is received at an EC-In terminal and the Advance′ signal. This EC signal is supplied by a switch 114 when in the upper position (as viewed in FIG. 2B) to the 0-input of the first flip-flop 100 and via inverter 116 to the 1-input of FF–100. When the switch 114 is in the lower position (as viewed in FIG. 2B), a negative potential is provided in place of the EC signal. This negative potential represents the EC′ signal and effectively resets FF–100 to the 0-state.

The 1- and 0-outputs of FF–100 are used as EC–1 and EC′–1 signals, the corresponding outputs of FF–102 are used as EC–2 and EC′–2 signals, and so on. The EC–8 signal from FF–108 is also used as an EC-Out signal which is supplied directly to the EC-In terminal of the succeeding data collector 53 if one is used. This connection effectively cascades the shift registers of successive data collectors.

Three gates 118, 120, and 122 receive the eight EC signals from the communtator flip-flops in groups of three, with the third input of gate 122 being a command signal Zero′-In (in inverted form) when a second data collector 53 is connected thereto. The outputs of the gates 118, 120, 122 are inverted and supplied to another gate 124, the output of which is supplied, via a switch 126 in the lower position thereof, as an input to the 1-output of FF–100.

When the switch 126 is in the upper position (as shown for data collector 53 in the lower right corner of FIG. 2B), the Zero signal is supplied to an inverter 128, the output of which is connected to the Zero′-Out terminal. Thereby, a Zero′ signal is supplied to the preceding data collector in the sequence.

The gate 124 supplies a high level signal when all of the EC inputs to the gates 118, 120, 122 are low, and the Zero′-In terminal is also low (or open-circuited). This high signal at the output of gate 124 is effective to set FF–100 to a 1-state. Thus, the gates 118–124 are effective to recognize the condition of all of the commutator flip-flops 100, 102, 108 being in the 0-state, and to set FF–100 to the 1-state under those circumstances. Where a plurality of data collectors are connected in a string, the Zero′ signal from any one of them represents that all of its flip-flop stages are in the 0-state and that those of the succeeding data collectors are likewise in 0-states. Thus, only when the shift register stages of all the data collectors are in the 0-state is the first stage FF–100 set to the 1-state.

In operation, initially one of the flip-flops of the commutator is in the 1-state (if all of them are in the 0-state, gate 124 supplies a 0-signal to set flip-flop 100 to the 1-state). With each Advance′ pulse that is supplied (at the trailing edge thereof when it goes high) this 1-state is successively transferred to the succeeding flip-flop of the commutator. Thereby, during eight successive Advance′ pulses the EC signal appears at the EC–1 to EC–8 lines successively. When the first flip-flop 100 is in the 1-state, console #1 (FIG. 2A) is enabled by the EC–1 signal supplied to the switch contacts 92. This enable signal is passed by all of the switches 80–88 that are closed and via the associated diodes 94 to the associated output lines. Thereby, the data collector output lines SIC–1 to –20 contain a combination of high signals representing the particular stock selected by the operator. In addition, one of the category selectors H or L contains a high voltage signal. This combination of request signals at the output of the data collector is handled as a request message to obtain the pertinent information from the slave drum and to transmit it back to the data collector. Upon completion of the reply message, an Advance pulse is supplied to the commutator flip-flops 100, 102, 108 to step the 1-state to the second flip-flop 102, at which time a high signal appears on line EC–2 to enable console #2. This operation is repeated successively and upon the 1-state being supplied to flip-flop 108, console #8 is enabled to perform its request.

In FIG. 2C the reply message portion of DC–1 is illustrated. Associated with console #1 is a 12-bit register 129 comprising the flip-flops 130, 132, 134, 136 and eight other flip-flops and associated logic that are simply represented as the block 138. Each of the stages is identical and includes, in addition to the flip-flop such as FF–130, an information line input 140 which is connected via an inverter 142 to the 0-input of the associated flip-flop and via inverter 144 to the 1-input of the associated flip-flop 130. The Advance′ signal (from inverter 110) and the EC′–1 signal are gated together in gate 146 and applied to the T-inputs of all of the register flip-flops 130–138. The outputs of the flip-flops are derived from the 0-output thereof via individual isolating inverters 148. In console #1 the outputs of inverters 148 are decoded to decimal form and manifested by a suitable display device; and appropriate arrangement therefor is described in the copending application of Sinn, "Data Storage System," Ser. No. 102,882, filed April 13, 1961.

A second 12-bit register 149 which is generally the same as the console–1 register is represented in FIG. 2C by only the first flip-flop stage 150 thereof. A gate 152 receives the Advance′ and EC′–2 signals and provides its output to the T-inputs of the second register 149. The second register flip-flops 150, etc. receive their inputs via the inverters 142 and 144, in the manner described above, when the console #2 is enabled. In a similar fashion, separate 12-bit registers are provided for each of the consoles; only the first stage 154 of console #8 register 153 is illustrated in FIG. 2C. The register 153 receives the information inputs appearing on the information lines passed via the inverters 142 and 144 when the EC′–8 signal and the Advance′ signal pass through gate 156 to trigger the flip-flops 154, etc.

Each of the other data collectors has its information registers constructed in the same manner as described for DC–1. The eight 12-bit registers in DC–2 for consoles #9–16 are respectively enabled by the associated signals EC′–9 to –16. The Advance signal is also applied to DC–2 from the Advance-Out line (FIG. 2B). The output of each inverter 144 is connected to the associated information input line 160 of DC–2. Each of the twelve information lines is similarly connected via inverters 162 and 164 to the 0- and 1-inputs of these register flip-flops in the manner described above for DC–1.

A third data collector, if required, has its information (12-bit) registers connected to the information lines of DC–2 in the same fashion as those of DC–2 are connected to DC–1, and so on. Thereby, the string of data collectors may be made as long as is desired.

In operation, after the first console has sent its request in the form of SIC′ signals and a category signal, the EC–1 signal continues to be high until twelve bits of information are supplied to the lines 140 and the Advance′ pulse is received. At the leading edge of the Advance′ pulse the gate 146 supplies a pulse to the T-inputs of the register flip-flops 130–138 for console #1 to pass the twelve bits of information to the associated flip-flops. Since all of the other EC signals are low at that time, none of the registers of the other consoles receive the information bits. After the information is registered, the trailing edge of the Advance′ pulse is effective in the sequencing shift register 99 (FIG. 2B) to step the 1-state to FF–102 so that EC–2 is available as a high enabling signal, and the EC–1 line together with the other EC lines are low. The request of console #2 set up on the SIC and category selector switches thereof is then processed in a similar fashion. At the next Advance pulse, the twelve information bits that are received on the lines 140 are passed into the 12-bit register flip-flop associated with console #2 under control of EC′–2, and the sequencer 99 is stepped to obtain EC–3. This operation continues successively with each console in order, having its request processed and the requested information returned to the associated 12-bit information register. After the eighth console has had its request filled (where only a single data collector is used), the sequencer logic sets FF–100 to provide EC–1, and the cycle is repeated.

The connection of DC–2 to DC–1 involves the connection of the Advance line thereof to the Advance line in DC–1; and the connection of each information line 160 in DC–2 to the output of the inverter 144 associated with the corresponding information line in DC–1. A common ground connection in the first data collector is connected to that of the second. In addition, the EC-Out line at FF–108 of DC–1 is connected to the EC-In terminal of DC–2; and the switch 114 in DC–2 is connected to the upper position to receive signals from its EC-In terminal. Also, the switch 126 in DC–2 is connected to the upper position to supply the outputs of its gate 124 via switch 126 and inverter 128 and the Zero′-Out terminal of DC #2 to the Zero′-In terminal of DC #1. These connections are shown in the lower right hand corner of FIG. 2B.

In operation, with the two data collectors 52 and 53 connected together, a 16-part commutation cycle is provided; that is, upon completion of the 8-part cycle in the commutator of DC–1, the 1-state is transferred via the EC-Out terminal to the EC-In terminal of DC–53. From there via switch 114, the 1-state is transferred to the first flip-flop of the commutator in DC–53, which provides the EC–9 signal (corresponding to the EC–1 signal in DC #2), and so on. Upon completion of the cycle in DC #2, its logic corresponding to gates 118–124 generates a Zero signal in DC–2, which signal is passed by the switch 126 and inverter 128 as a Zero′-Out signal, which becomes the Zero′-In signal of DC–1. Consequently, the gates 118–124 of DC–1 generate a Zero signal which is passed by switch 126 to generate the 1-state in FF–100 to start a new cycle with console #1 in the enabled condition.

In a similar fashion, additional data collectors may be cascaded as desired. The data collectors are all constructed in the same fashion so that they may be used interchangeably. When a data collector is connected as the first data collector, its switches 114 and 126 are in the down position as shown in FIG. 2B; for succeeding data collectors, the switches 114 and 126′ are in the up position, also as shown in FIG. 2B.

This logical configuration of gates 118, 120, 122, and 124 is used to avoid a difficulty associated with shift registers. Namely, where the shift register is used to carry a single 1-bit that is recirculated in the shift register, that bit may be lost due to some momentary malfunction of the hardware or spurious transient condition, or that bit might be joined by an extra spurious bit generated by noise or malfunction. This problem is resolved by the logic of gates 118, 124 recognizing the condition of all of the register stages being in the 0-state to initiate the entry of a bit in the first stage of the shift register. Thereby, it is assured that a bit is always present in the shift register since its loss is only for the period involved in recognition of the condition and generation of a new bit.

If an extra bit is spuriously generated, this condition exists only for the period involved in shifting that bit out of the register. That is, a new bit is not generated until both of the existing bits have been generated out. Thus, there may exist a short transient period when two shift register stages may contain a 1-state; during this period, two consoles may be enabled at the same time which would result in a garbled operation for an enabled console, but this condition lasts only for the cycle time of the commutator which at most is only of the order of a fraction of a second and not likely to be more than a second or so. Accordingly, the spurious condition is essentially unnoticed by the operator.

*Data terminus*

Figure 3A:
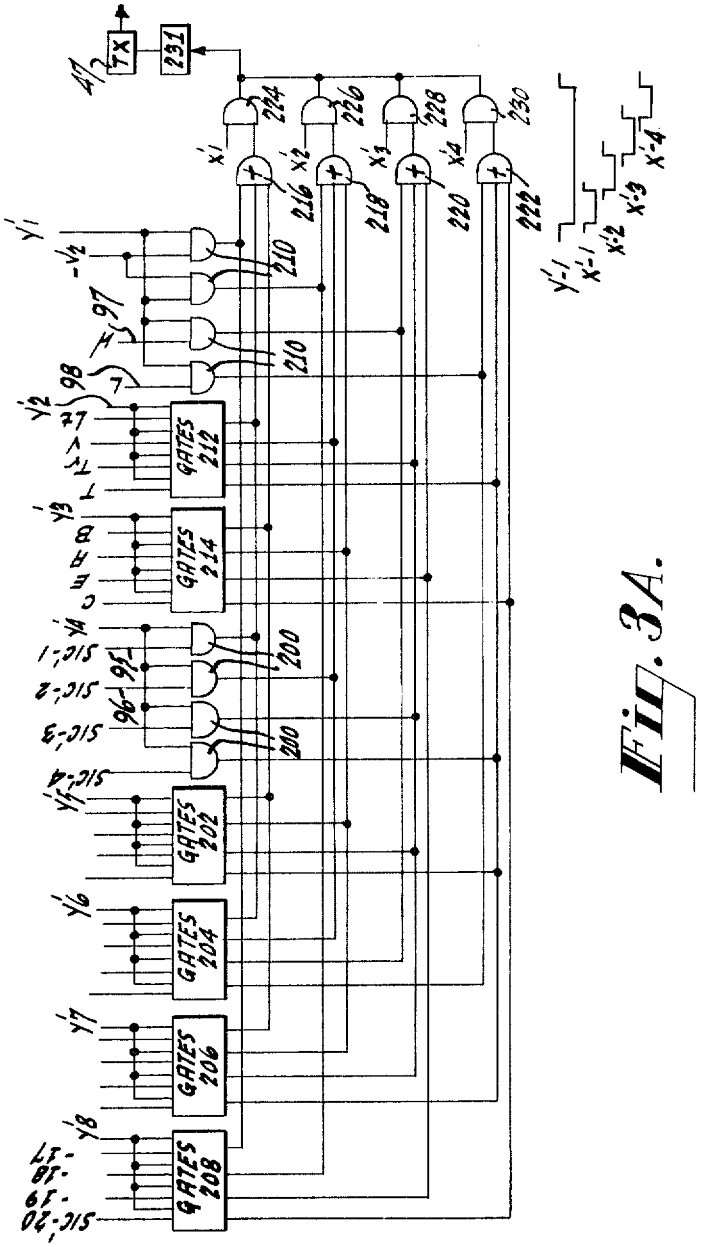
FIGS. 3A and 3B are schematic block and logic diagrams of portions of a data terminus unit that may be used in connection with the system of FIG. 1.

In FIG. 3A the portion of the data terminus which receives the request message lines is illustrated. A first set of request message gates 200 respectively receive the four SIC lines SIC′–1 to SIC′–4; these gates 200 also receive a timing pulse Y′–4. The next set of four gates 202 (shown as a block) receive the SIC′–5 to SIC′–8 lines, respectively, together with a timing signal Y′–5. In a similar fashion, the four gates 204 respectively receive SIC′–9 to SIC′–12 together with Y′–6; the four gates 206 respectively receive SIC′–13 to SIC′–16 together with Y′–7; and the four gates 208 respectively receive SIC′–17 to SIC′–20 together with Y′–8.

Another four request-message gates 210 receive Y′–1; and the first two of these gates receive a negative voltage level, and the other two respectively receive the H and L selector signals. The next four selector request gates 212 receive Y′–2, and these four gates respectively receive selector signals corresponding to Last, Volume, Trades, and Time. The next four request gates 214 receive Y′–3, and, in addition, they respectively receive the Bid, Ask, Earnings, and Close selector signals.

The output of each first gate of the groups 210, 212, and 214 is connected to buffer 216; the outputs of the second gates of these groups are supplied to the buffer 218; the outputs of the third gates of these groups, to the buffer 220; the outputs of the fourth gates of these groups, to the buffer 222. In a similar fashion, the gates 200–208 are connected with their outputs, respectively, to the four buffers 216–222. The outputs of the buffers 216, 218, 220, and 222 are respectively connected to gates 224, 226, 228, and 230 together with timing pulses X′–1 to X′–4, respectively.

In operation, the Y′ timing pulses last for four successive X′ pulses; that is, for the period of the X′–1 through X′–4 pulses, as indicated by the idealized graph in FIG. 3A. When Y′–1 occurs, the gates 210 are enabled to pass their input signals via the buffers 216 to 222 to gates 224 to 230, respectively. Initially, X′–1 and the low voltage level supplied thereto produce a high output from gate 224 representing a 1-bit; then X′–2 enables gate 226 with the similar low voltage applied thereto to supply another 1-bit output; X′–3 enables gate 228 to produce the H′ signal as an output; and X′–4 enables gate 230 to supply the L′ signal. These four signals are supplied via a level setting circuit 231 to Tx 47; the level setting circuit may be an adapting amplifier that converts the gate output signals to levels suitable for inputs to the transmitter. The next cycle of X′ signals occurs during Y′–2 when gates 212 are enabled, during which time the next four selector signals are passed through the output gates 224–230; and the next cycle of X′ pulses successively enables passage of the next four selector signals supplied to gates 214 through to the output line and T*x* 47. During the next cycle of Y′–4, the SIC–1 to –4 are successively produced as outputs of gates 224–230, respectively, by the X′–1 to –4 signals. This cycle is repeated in a similar fashion during the Y′–5, Y′–6, Y′–7, and Y′–8 timing periods, during the last of which the SIC–17 to –20 signals are successively produced as outputs of gates 224–230, respectively.

Thus, the data terminus unit of FIG. 3A is effective to receive the SIC and selector signals in parallel from the data collector and to convert the parallel series of signals to a train of signals in serial form preceded by two 1-bit index signals represented by high voltage levels. This serial train of signals is the request message.

Figure 3B:
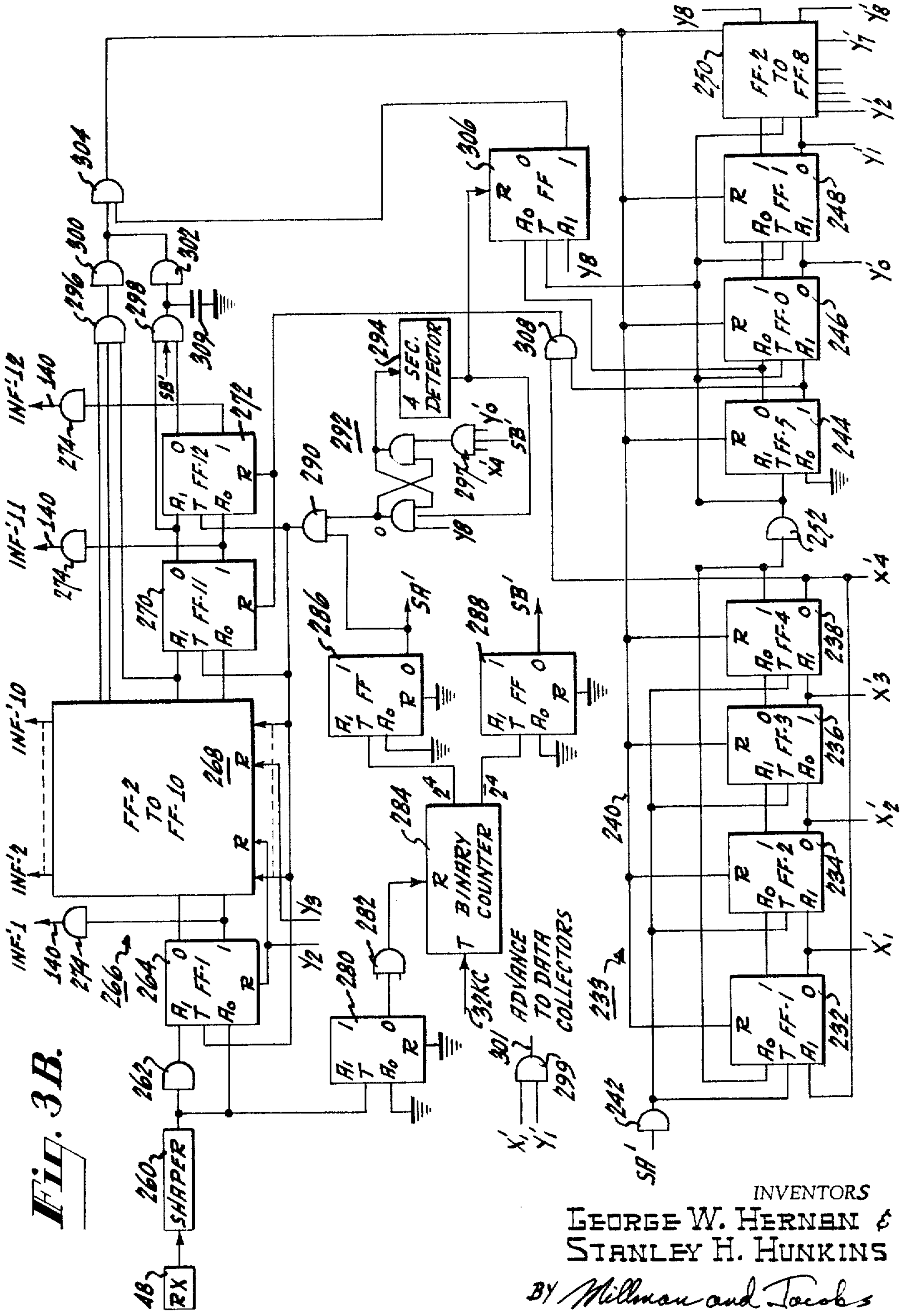

In FIG. 3B the remainder of the data terminus unit 50 is illustrated; and in the lower portion thereof, the sequencer 233 for developing the X′ and Y′ signals is illustrated. This sequencer includes a 4-stage X-shift register made up of four flip-flops 232–238 connected in cascade with the 1- and 0-outputs of the first FF–236 respectively connected to the 0- and 1-inputs of the second FF–238; the 1- and 0-outputs of the second FF–234 respectively connected to the 1- and 0-inputs of the third FF–236 (the third FF–236 being connected in a relatively "inverted" form); the 0- and 1-outputs of the third FF–236 being connected to the 0- and 1-inputs of the fourth FF–238; and the 1- and 0-outputs of the fourth FF–238 being connected to the 0- and 1-inputs of the first FF–232 for recirculation. These flip-flops 232–238 are reset at the same time via line 240. Shift pulses are supplied in the form of SA′ signals via inverter 242 to the T-inputs of the shift register flip-flops.

In operation, the shift register flip-flops 232–238 are initially reset by a high signal on the line 240. When so reset, the line X′–3 is a low signal (being taken from the 1-output of FF–236), and lines X′–1, X′–2, and X′–4 are all high. When the next shift pulse SA is applied to the T-inputs, the 1-state is shifted to FF–238 so that line X′–4 is low, and the other outputs are all high. The succeeding shift pulse SA causes the 1-state to be recirculated so that the low output is transferred to line X′–1; the third SA shifts the low output to line X′–2; and the fourth SA shifts the low output to line X′–3, and so on cyclically.

The other part of the sequencer includes the shift register of flip-flop stages 244, 246, 248 (respectively represented as FF–S, FF–0, FF–1), and of seven similar stages in a block 250 (representing FF–2 to –8). FF–S is connected in an "inverted" configuration (similar to flip-flop 236 described above), and has its 0- and 1-outputs respectively connected to the 0- and 1-inputs of FF–246. The 1- and 0-outputs of FF–246 are connected to the 0- and 1-inputs of FF–248, and so on with flip-flops 248–250 connected in the latter fashion. The Y′–0 to Y′–8 outputs are taken from the 0-outputs of FF–0 to –8. FF–244 to –250 are also reset from the line 240. The T-inputs of all of these flip-flops receive signals via inverter 252 from the 1-output of flip-flops 238. The 0-input of flip-flop 244 is connected to ground, and the 1-input thereof is left unconnected.

In operation, the reset signal initially resets all of flip-flops 244–250. Thereafter, upon recirculation in the X-register, FF–238 is reset to the 0-state and its 1-output changes from a ground voltage to a low voltage which is inverted by inverter 252 to supply a ground trigger voltage to FF–244 to –250. FF–246 is set to the 1-state due to the ground and low voltages then appearing on its 0- and 1-inputs, respectively (from reset FF–244); and flip-flop 244 is also set to the 1-state due to ground on its 0-input. Upon completion of the next complete cycle of the X flip-flops 232–238, another trigger pulse is passed via inverter 252 to shift the 1-state from FF–246 to FF–248. This process is repeated for each cycle in the X flip-flops, and, for nine such full cycles, the 1-state is successively transferred from FF–246 through the last flip-flop of block 250. The initial two steps in FF–236 and –238 are used to start the sequence by transferring the 1-state into FF–246, which 1-state is effectively established by the inverted position of reset FF–244. In other words, two SA pulse times after reset of all the sequencer flip-flops 232–238 and 244–250, FF–246 is set to the 1-state to develop the Y′–0 signal. After the next four SA pulses, the X flip-flop cycle is again completed to develop Y′–1, and so on. When Y′–1 is developd, the gating operation of the next request message is initiated as described above in connection with FIG. 3A.

In the upper part of FIG. 3B the portion of the data terminus that is effective to receive and process the reply message from R*x* 48 is illustrated. The signals from R*x* 48 come in at a 1 kilocycle rate and are supplied to a shaper 260 which is an appropriate form of amplifier and signal-forming and level-setting circuit to adapt the signals from R*x* 48 to the form needed for the circuitry of the data terminus. The output signals of the shaper 260 are a high, or ground, voltage level representing "1" and a low voltage level representing "0."

These voltage levels are supplied directly (and via an inverter 262) to the 0-input (and the 1-input) of the first flip-flop 264 of 12-bit reply message shift register 266. FF–2 to –10 of shift register 266 are illustrated simply by a block 268; FF–11 and –12 thereof are represented by the blocks 270 and 272. The flip-flops of the shift register 266 are connected in the manner described above, and the stages are generally the same except for features hereinafter noted. The information outputs from the shift register 266 are taken in parallel from the 1-outputs of the individual flip-flop stages and fed via inverters 274 to the lines INF′–1 to –12, respectively, which are the reply message input lines 140 to the data collector (FIG. 2C).

The information pulse from the shaper 260 is also supplied to a flip-flop 280 which has its R- and 0-inputs grounded so that it functions as a pulse-former. The 0-output of FF–280 is applied to an inverter driver 282 which resets a 5-stage binary counter 284. The trigger input to the counter 284 is from an oscillator supplying pulses at a 32 kilocycle rate. The count of 16 in the binary counter is detected by supplying the 1-output of the last stage of counter 284 to the 1-input of a pulse-former FF–286, the R- and 0-inputs of which are grounded. The opposite side of the last stage of the binary counter 284 is supplied to the T-input of another pulse-former FF–288, the 0- and R-inputs of which are grounded. The 0-output of FF–286 is used as a shift pulse signal SA′, which is applied to gate 290 and thence to the T-inputs of the twelve stages of shift register 266; SA′ is also used as the trigger input of sequencer 233.

The gate 290 is enabled by the 0-output of FF–292 (shown as formed by two NOR circuits connected in a regenerative configuration). The set input to the flip-flop 292 is the Y–8 signal which is available from the last stage of the sequencer 233 during the last portion of the transmission of the request message. Another set input to FF–292 is a normally low signal from a four second detector circuit 294 which is described below. Any reply information left in the register 266 is effectively cleared during the transmission of the request message; that is, Y–2 clears FF–1 to –5, and Y–3 clears FF–6 to –10, and FF–11 and –12 are cleared by the first shift pulses SA supplied thereto.

The binary counter 284 and associated logic function to produce a shift pulse SA′ for each count of 16 therein. The synchronization of these SA′ pulses representing counts of 16 is by means of the reset of the binary counter 284 each time that an information 1-bit pulse is received. That is, the binary counter 284 is reset at the leading edge of an information pulse, and the count of 16 occurs approximately midway in the duration of that information 1-bit pulse (which is being supplied at a 1 kc. rate and of 1 millisecond duration) so that the narrow SA' pulse (the duration of which is the order of microseconds) effectively samples the information pulse at its midway portion. Since the information 1-bit pulses occur relatively frequently in any reply message, the binary counter operation effectively synchronizes the reply message register 266 to the dataphone transmission.

The reply message that is transmited is in the form of a 17-bit message, the last twelve bits of which are information and the first five bits of which are index 1-bits. When the first five index bits are established in FF–8 through FF–12, gates 296, 298, 300, and 302 recognize FF–8 through –10, and gate 298 receives the 0-outputs of FF–11 and –12 together with the SB' pulse. The outputs of the gates 296 and 298 are respectively connected to the inverters 300 and 302 which function as a gate since their collectors are tied together (i.e., the common output of inverters 300 and 302 is a low signal only when the respective inputs are all high, which condition represents all five index signals being supplied to gates 296 and 298 together with SB'). Thus, when the five index bits are established in FF–8 through –12, a signal is supplied to gate 304 (enabled by the 1-output of a flip-flop 306) to supply a reset pulse to the line 240.

The resetting of the sequencer via line 240 initiates the cycle of sequencer 233 in the manner described above. At the same time, the last five bits of the request message continue to be supplied via R*x* 48 and shaper 260 to the reply message shift register 266. These next five information bits are effectively counted in the sequencer 233; that is, the receipt of the first of these last five bits in FF–264 is synchronized with a first SA', which is counted by the 1-state being shifted into FF–238 of the sequencer. The next four bits are counted by a complete cycle of the X flip-flops and FF–238 is again in the 1-state when the fifth bit has been established in the shift register 266. The count of the last five information bits is indicated by X'–4 and Y'–0, which signals are supplied to gate 297 together with SB' to reset FF–292, which, in turn, closes gate 290 to prevent further shift pulses being supplied to the reply message shift register 266.

After the five index pulses are recognized in FF–8 to –12 and the sequencer flip-flops are reset, the first SA' establishes X'–4 which is applied to a gate 308 together with the 1-output of FF–244. The output of gate 308 is used to reset FF–11 and –12 of reply message shift register 266 (capacitor 309 connected in shunt between gates 298 and 302 stretches the pulse from FF–11 and –12 and ensures a full reset action notwithstanding the resetting of the latter). This reset condition of FF–11 and –12 prevents a second, spurious recognition of the index pulses as the request message is shifted into FF–8 (the first bit thereof). This spurious recognition might otherwise arise where the first bit of a reply message is a 1-bit, and when it is shifted into FF–8 after the true index recognition. Due to the use of binary coded decimal for the signal code representation, a five 1-bit combination does not occur in succession in a valid reply message. In this code representation, only the first or the second bit (most significant digits) of a signal transmission, but not both, can be a "1." The reset action of FF–11 and –12 by X'–4, Y'–0 takes place when the first information bit of the reply message is being stepped into FF–8. Accordingly, the gates 296 and 298 receive a five 1-bit index combination only when a valid conditions exists.

The four second detector 294 is a circuit which is driven by the positive voltage step appearing at the 1-output of FF–292 when the latter is set, e.g. by Y–8 upon completion of the transmission of the request message. If FF–292 is not set again in that four second period by another Y–8, the detector 294 supplies a positive pulse to set FF–292 and to reset FF–306. The latter enables gate 304 to pass a reset signal to line 240. As is noted below, a special reply message is generated under the conditions indicated so that the five index bits thereof are established in FF–8 to –12 to generate the reset signal that is supplied via enabled gate 304 to reset the sequencer 233. Thereby, the sequencer cycle is initiated so that the next Advance pulse is generated (by gate 299), and the next console request can be serviced.

A suitable circuit for detector 294 may include a transistor that is normally biased on to provide the desired positive output signal and that is biased off by the voltage across a charged capacitor that is coupled to the 1-output of FF–292. The capacitor is charged by the setting of FF–292 and has a four second discharge time constant to a voltage at which the transistor is biased on.

The four second detector 294 is effective to correct any momentary stalling of the control cycle, for example, due to FF–292 or –306 being in the wrong state when the power is turned on, or due to a reply message not being received to reset the sequencer 233.

Normally, flip-flop 306 is reset by the 0-output of FF–S (which condition occurs when the reset pulse is supplied via line 240) and by the trigger pulse output of inverter 252, which occurs on the second SA' after reset. When reset, gate 304 is closed, and detection of the 5-bit index is blocked effectively. The Y–8 signal is used to set FF–306 to enable the gate 304 when the end of the request transmission is essentially completed. Thus, FF–306 opens gate 304 only for the first index detection so that if an improper reply message is received, the sequencer 233 is not reset. With the generation of the second SA', after the sequencer is reset, X'–1 and Y'–1 generate an Advance pulse via gate 298 (FIG. 3B). The Advance pulse is effective to initiate storage of the twelve information signals INF'–1 to –12 of the reply message that are established in reply register 266 in the proper data collector registers via lines 140. This Advance pulse from gate 298 is also effective to step the data collector commutator (FIG. 2B), as described above, in order to enable the next console to supply its request message. This request message is thus supplied to the gates 200–214 (FIG. 3A) at the end of the Advance pulse during X'–2 after the previous reply has been sent to the data collector, and after gate 224 has passed the first index bit of the next request message. Thereby, the next console's request is immediately processed.

Thus, the reply portion of the data terminus is effective to receive the reply information as a serial message from the retriever. The information is established in parallel form and on Advance signal is generated and supplied to the data collectors. Thereby, the data collectors are actuated to store the information for the requesting console and to enable the next console to send its request.

*Retriever*

Figure 4:
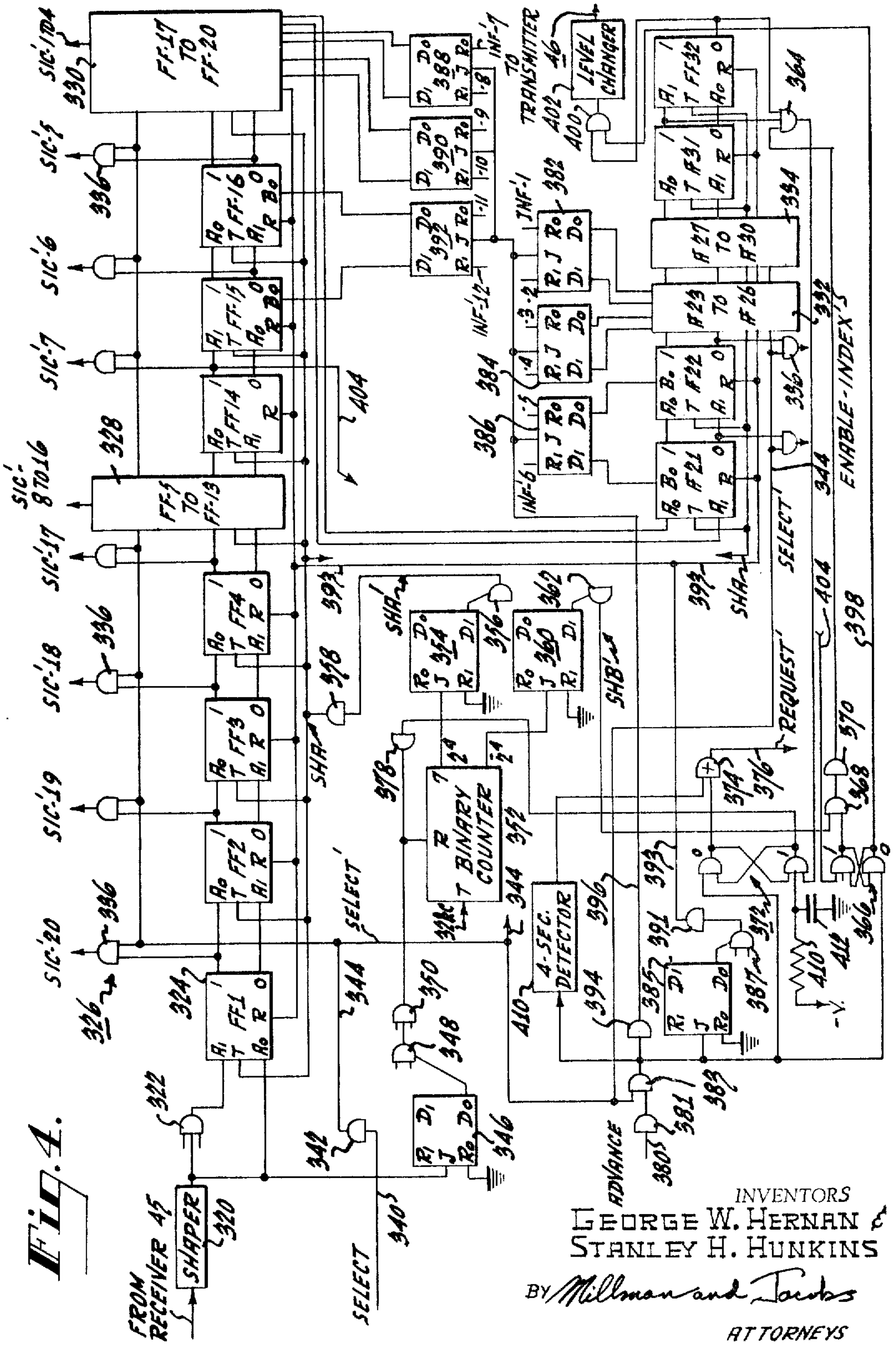
FIG. 4 is a schematic block and logic diagram of a retriever unit that may be used in connection with the system of FIG. 1.

In the retriever 42, illustrated in FIG. 4, the request message signals received from the data terminus (FIG. 3A) via R*x* 45 are supplied to a shaper circuit 320 which sets the proper levels and forms the pulses received from the dataphone. The signal output of the shaper 320 is in the form of a ground level for binary 1 and a low voltage for binary 0.

These signals are supplied directly and via an inverter 322 to the 0- and 1-inputs of a first flip-flop 324 in a 32-stage message shift register 326. Generally speaking, the thirty-two stages of the shift register 326 are connected in a manner similar to those described above with the 1- and 0-outputs of one connected to the 0- and 1-inputs of the next, except for FF–15 and –32 which have their inputs inverted. FF–5 to FF–13 are represented by a block 328, FF–17 to FF–20 are represented by block 330, FF–23 to FF–26, by a block 332, and FF–27 to FF–30, by a block 334. In each of these blocks the flip-flop stages are connected in the same way as the stages immediately precedent thereto, except as hereinafter noted.

Outputs from FF–1 to FF–30 are taken in parallel via gates individually associated with these flip-flops. It will be apparent that the outputs from FF–1 to FF–20, respectively, represent the bits SIC′–20 to SIC′–1, and the outputs from FF–21 to FF–30, respectively, represent the selector bits E–H in a manner consistent with the operation of the gates in the data terminus (FIG. 3A). The outputs of FF–1 to FF–14 are derived from the 1-outputs thereof; the outputs of FF–15 to FF–30 are derived from the 0-outputs thereof due to the inverting relationship of the inputs of FF–15; and the outputs.

The message signals from the shaper 320 are also supplied to the J-input of a jam gate 346, the 0-input of which is grounded. This gate 346 steers the ground signal at one of its inputs to the corresponding one of its outputs and effectively differentiates the pulse supplied to its J-input. Thus, jam gate 346 supplies a pulse at its 0-output which is connected to the base input of an inverter 348 which, in turn, is connected via inverter 350 to the R-input of a 5-stage binary counter 352. The counter 352 receives pulses from a 32 kc. oscillator in a manner similar to that described for the binary counter 284 in the data terminus (FIG. 3B). The 16-count output of the binary counter is supplied to the J-input of a jam gate 354, the 1-input of which is grounded, and the 1-output of which is applied to the base input of an inverter 356, which supplies shift pulses SHA′ via inverter 358 to the T-inputs of FF–1 to FF–32.

The inverted output of the binary counter at its fifth stage is applied to the J-input of jam gate 360, the 1-input of which is grounded, and the 1-output of which is connected to the base input of an inverter 362 to supply control pulses SHB′ to various portions of the logic.

In operation, when the request message is received from R*x* 45, the successive thirty-two bits thereof are established in FF–1 to FF–32 under the control of the shift pulses SHA. The first two bits of the request message are index 1-bits (as noted above in connection with the development of the request message in FIG. 3A). When these index 1-bits are established in FF–31 and FF–32, an index detector gate 364 is enabled by the 1-output of FF–31 and the 0-output of FF–32 (FF–32 being connected in inverted form). A third input to gate 364 is an Enable-Index′ signal, which is developed from the 1-output of a reset output flip-flop 366 (gated with SHB′ in gate 368 and inverted by inverter 370).

The output of gate 364 is used to reset a shift flip-flop 372, the 0-output of which is supplied via inverter 374 to a Request′ line 376 to the slave output 38. The Request′ signal on line 376 asks the slave output for access to the slave drum 20, and when the slave output 38 is available, the Select signal is supplied therefrom on line 340. This Select signal is effective, via inverter 342 and line 344, to open the gates 336 and read out the contents of the message shift register 326 in parallel. The Select and Request′ signals continue thereafter for the time that is required by the slave output to process the request and obtain the requested information, and effectively maintain a coupling between retriever 42 and slave output 38.

For the duration of the Select signal, no further shift pulses SHA′ are developed by the binary counter; that is, the 1-output of reset shift flip-flop 372 is supplied via inverter 378 to maintain the binary counter 352 in a reset condition. Accordingly, any signals that may be supplied from R*x* 45 during the time that the Select signal is on are not shifted into FF–1 and do not affect the contents of the message shift register 326.

When the requested information has been obtained by the slave output, it supplies an Advance-signal on line 380 and, at about the same time, supplies the twelve information bits to the inputs of six jam gates 382–392; gate 382 receives INF′–1 and –2 at its respective two inputs, and so on, with gate 392 receiving INF–11 and INF–12 at its respective two inputs. The 1- and 0-outputs of jam gate 392 are respectively connected to the B–0 inputs of FF–15 and –16, and so on, with the 1- and 0-outputs of gate 382 being applied to the B–0 inputs of FF–25 and –26.

When the Advance pulse is received on line 380, it is supplied via inverter 381 to gate 383, which is enabled by still present Select′. The output of gate 383 is applied to a jam gate 385, the 0-input of which is grounded, and the 0-output of which is applied to the base input of inverter 387 which, via inverter 391, supplies a reset signal to line 393. Thus, the Advance signal on line 380 is differentiated in gate 385 to supply a high reset signal on line 393 which is connected to the R-inputs of all the stages of message register 326. Thus, the Advance pulse is effective at its leading edge to reset the shift register 326.

In addition, the Advance pulse is inverted by inverter 394 and supplied to the J-inputs of the jam gates 382–392. Thus, when the Advance pulse terminates, Advance′ on line 396 goes positive to jam the information signals on the inputs of the gates 382–392 into FF–26 to –15. Accordingly, the requested information is established in a portion of the message register 326 and ready for transmission back to the data terminus 50.

The gated Advance pulse is also supplied, at its leading edge, to set the output flip-flop 366, which supplies an enabling output signal via line 398 to output gate 400, the output of which is supplied by a level-changing circuit 402 to the transmitter 46. When the output gate 400 is initially enabled, the 0-output of reset FF–32 is at a high voltage, and no change takes place at the output of gate 400.

The gated Advance pulse is also supplied at its leading edge to set shift flip-flop 372 so that its 1-output is high, and the disabling, resetting signal on the binary counter 352 is removed. Accordingly, upon the next count of 16 in the binary counter 352, a shift pulse SHA is generated which shifts the reset state of FF–31 into FF–32, where it is effectively inverted and appears on its 0-output as a low voltage signal that is passed by enabled output gate 400 as a 1-bit to the level changer 402, which supplies it to T*x* 46. Successive shift pulses SHA are generated from the binary counter 352 at the transmission rate, and the first five bits (originating in FF–27 to –31) passed by gate 400 are index 1-bits.

The successive shift pulses SHA shift the information out of registers FF–15 to FF–32, and via gate 400 to T*x* 46 for transmission back to the data terminus. Upon completion of this transmission, the message shift register 326 is clear and ready to receive the next request message from R*x* 45. When the data terminus receives the full reply message, the sequencer 233 thereof initiates the sending of another request message. Accordingly, the retriever is in proper condition to receive that next message.

When the first bit (an index 1-bit) of the next message is supplied to FF–14 of message register 326, the 1-output of FF–14 connected via line 404, to the output flip-flop 366 resets that flip-flop. The latter provides Enable Index′ for gate 364 to detect the arrival of the index bits of the request message in FF–31 and –32. FF–14 is used to provide the detection of the first bit of the new request message for changing the state of output flip-flop 366 because it is the last flip-flop in the register 326 which is not used for the reply message. This insures that the index detector gate 364 remains disabled as long as convenient to prevent any noise signal which may have gotten into the shift register from initiating operation of the control logic. However, if any serious noise does result in a detection by gate 364, it may cause a momentary error in the display, but on the next request cycle within a short period of time, the display is corrected, and to the operator, it may appear only as a momentary flicker.

At the 1-input of the shift flip-flop 372, a resistor 410 and capacitor 412 are connected in series with their junction at the input to the flip-flop. This resistor-capacitor combination is effective to apply a positive pulse to the flip-flop to reset it when the power is first turned on. The reset flip-flop 372 has the effect of resetting the binary counter 352 and also stimulates the sending of Request' to the slave output to initiate the operation of the system and the effective coupling of the retriever to the slave ouput.

When the Advance pulse sets the flip-flop 372, the Request signal is terminated, and at about the same time, the slave output operates, as noted below, to step to fill the request of the next retriever.

Another 4-second detector 410 (similar to that 294 of FIG. 3B) is provided in the retriever and is connected to receive the Advance pulses via gate 383 and supply a pulse to buffer inverter 374. Thereby, if an Advance pulse is not received within 4 seconds, the detector 410 initiates the generation of Request' which signal is effective to couple the retriever to the slave output, as is described below.

To summarize, the retriever receives a serial request message from the data terminus and establishes it in parallel in register 326. The index bits are detected, Request' to the slave output is generated, and Select is returned therefrom. When the slave output is ready to return the reply information, it supplies Advance to clear the register 326 and enter the information therein in parallel. The information is then sent out as a serial reply message to the data terminus.

*Slave output*

Figure 5:
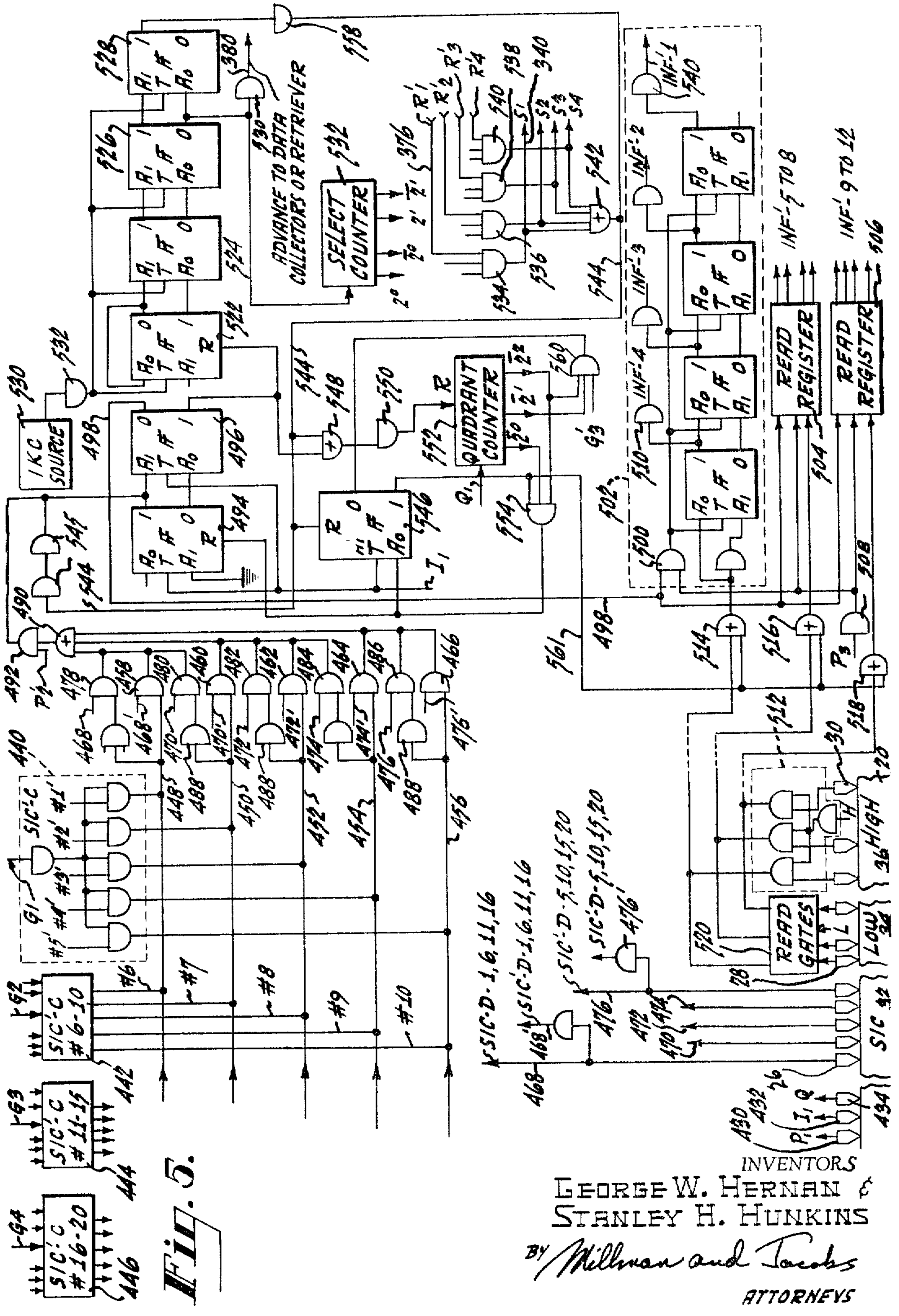
FIG. 5 is a schematic block and logic diagram of a slave output unit that may be used in the system of FIG. 1.

The control logic of the slave output unit is shown in FIG. 5. In the upper left hand corner of that figure are shown the twenty stock identifier signals SIC'–C of the request message and originating with the console. In the lower left hand corner of FIG. 5, a fragmental portion of the drum 20 is shown. An enlarged fragment of the drum 20 is shown in FIG. 9 illustrating the format of the arrangement of the SIC and information signals on the drum.

Figures 9, 10:
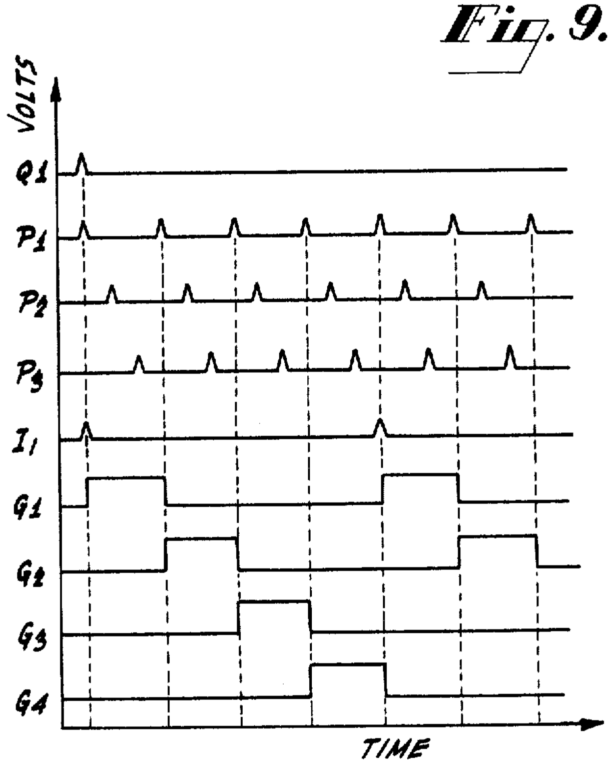
FIG. 9 is a schematic diagram showing the arrangement of information on a magnetic drum in the diagrams of FIGS. 1 and 2.
FIG. 10 is a schematic graphical diagram showing the time relations of waveforms occurring in the system.

Five tracks on the drum are provided for the stock identification code; and four bit positions around the drum, which make up a cell, store the twenty SIC signals in those five tracks, as illustrated in FIG. 9. That is SIC–1 to –5 are stored in the five tracks in parallel at the first bit position of the cell, SIC–6 to –10, in the second bit position, and so on. In another track on the drum a signal is stored at each bit position, and this signal, when read back by its associated recording head and amplifier 430 (FIG. 5), is used as a P–1 pulse (FIG. 10). In an adjacent track an indexing signal I–1 is stored at the first bit position of each cell, and this track is read by a recording head and amplifier 432 to provide the I–1 signal (FIG. 10) which occurs synchronously with the associated P–1. In a third track a quadrant signal Q is stored at each of four spaced quadrant points around the drum. At the corresponding P–1 and I–1 bit positions of the drum, the quadrant signal is read by a head 434 to provide the Q–1 signal (FIG. 10). From the P–1 timing signals, additional P–2 and P–3 timing signals occurring at substantially equally spaced intervals within a bit time interval are derived; for example, the P–2 and P–3 signals may be derived by applying the P–1 signal to two cascaded delay lines of approximately equal delay and deriving the P–2 and P–3 signals at the outputs of the respective delay lines. The G–1 to G–4 signal levels (FIG. 10) are produced on separate lines and occur at intervals corresponding to the 1–4 bit positions of each cell. They may be derived by triggering a 2-stage binary counter by successive P–1 pulses (after the stages of the counter are reset by I–1 pulses) and using a decoder to gate out G–1 to G–4 on separate lines during the time intervals when the respective counts are registered.

The gating signals G–1 to G–4 are respectively applied to four groups of gates 440, 442, 444, and 446 (FIG. 5), which gates also receive the SIC'–C signals. These gates 440–446 are similarly constructed, and only the details of gates 440 are shown. Gates 440 comprise five individual gates that respectively receive the SIC'–1 to SIC'–5 signals. Each of these gates is gated by the G–1 signal applied thereto via an inverter. The outputs of the five gates 440 are respectively connected to five lines 448–456 and thereby to five gates 458–466, respectively. The signals supplied from gates 440 to lines 448–456 are SIC–C–1 to –6 due to the inversion taking place in those gates. The gates 442 supply SIC–C–6 to –10 to lines 448–456, respectively, during interval G–2, and so on. The other inputs to the gates 458–466 are derived from the SIC bin 32 on the drum by heads and amplifiers 26 and supplied to lines 468, 470, 472, 474, 476 and via inverters to lines 468', 470', 472', 474', 476', respectively. During the gating interval G–1, SIC'–D–1 to –5 are applied to gates 458–466 (via lines 468'–476', respectively); during gating interval G–2, SIC'–D–6 to –10; during gating interval G–3, SIC'–D–11 to –15; and during G–4, SIC'–D–16 to –20.

The lines 448–456 are also respectively connected to gates 478–466, respectively, via separate inverters 488; thereby, the SIC–C' signals are supplied to the gates 478–486. The other inputs to the gates 478–486 are respectively the SIC–D signals from the lines 468–476.

The outputs of the gates 458–466 and 478–486 are all connected via a buffer 490 and a gate 492 (enabled by P'–2) to the 1-output of a coincidence flip-flop 494 to set FF–494 with a ground signal (the 1-output acting as an input terminal as described in detail in connection with the circuit configurations).

In operation, the logic established by the gates 458–466 and 478–486 is such that if there is coincidence, at least one of the inputs to each of those gates is high, and the outputs thereof are all low, so that a low signal is applied to the 1-output of FF–494, and it remains reset. However, if there is anti-coincidence in at least one of the five pairs of SIC–C and SIC–D signals, at least one of the ten pairs of signals applied to the ten gates 458–466 and 478–486 is low, and the output of the associated gate is high. Accordingly, the signal applied to the 1-output of coincidence flip-flop 494 is also high to set that flip-flop.

FF–494 is reset at the beginning of a cell of SIC signals by the I–1 pulse applied to the R input thereof (with the 1-input grounded), so that if FF–494 is still reset at the end of that cell, then coincidence is indicated.

Thus, if coincidence is detected between the console request signals SIC–C and the drum signals SIC–D over an entire cell, the next index signal I–1 finds FF–494 still reset, and its ground signal at the 0-output is effective to set FF–496 so that the line 498 at the 0-output thereof becomes low. The line 498 is connected to a gate 500 of a read register 502, and also to two similar read registers 504 and 506. These registers are constructed in the same fashion so that only the register 502 need be described in detail.

The other input to the gate 500 is the P–3 timing pulse via an inverter 508. The output of the gate 500 is applied to the T-inputs of the four flip-flops of register 502 connected as a shift register. The outputs of these four flip-flops are taken at the 1-outputs thereof in parallel via separate inverters 510 to provide the INF'–1 to –4 signals. The outputs of the read register 504 are the INF'–5 to –8 signals, and those from register 506 are the INF'–9 to –12 signals.

The inputs to the read registers 502–506 are derived from the category bins 34, 36, etc. on the drum 20. By way of illustration, the three tracks comprising the High bin 36 are read by individual read-write heads and amplifiers 30, the outputs of which are supplied to three read-out gates shown as a group 512. The other inputs to these gates 512 is the H selector signal derived from ıe retriever (in FIG. 4, the output of FF–30 gated by elect′). The outputs of the gates 512 are connected via ıdividual lines and buffers 514, 516, 518 to the inputs of ıe read registers 502, 504, 506, respectively.

The arrangement of the signals on the three tracks of ıe High bin are shown in FIG. 9 in which it is seen that he twelve information bits are arranged on three tracks ı a cell, with the first four information bits on a first rack successively, and the next four on the second track, ınd the last four on the third track. Accordingly, in FIG. 5 the first head and amplifier 30 (on the left) associated with the High bin 36 reads INF–1 to –4 successively and supplies them via the buffer 514 to the first read register 502; INF–5 to –8 are supplied from the middle track via buffer 516 to the read register 504 in succession, and similarly, INF–9 to –12 are supplied via the buffer 518 to the read register 506.

The Low bin 34 is read in a similar fashion by recording heads and amplifiers 28 via a set of read gates 520 and the buffers 514, 516, 518 to the read registers 502, 504, 506, respectively. The other bins that are provided are read in the same fashion with a set of gates similarly constructed and connected to the buffers 514, 516, 518 in the same fashion. Only one of the bins 34, 36, etc. is read out depending upon which selector signal is supplied in the request message.

The output of the buffer 514 is connected directly to the 0-input of the first flip-flop of register 502, and via an inverter to the 1-input thereof. Effectively, this flip-flop is set to the 1-state, and the 1-output thereof is high accordingly. The read-out of four successive bits to complete the cell establishes INF–1 to –4 in the read register 502.

Upon completion of this read-out of the cell of information, the next I–1 pulse resets FF–496 (FF–494 having been set during read-out of the selected bin due to anti-coincidence in the SIC cell that is read concurrently). Thereby, line 498 at the 0-output of FF–496 becomes high, and gate 500 is closed. Accordingly, no further information is read into the read registers 502, 504, and 506.

During the read-out operation, the 1-output of read-out flip-flop 496 is high and effective to reset FF–522 which remains reset until the completion of the read-out operation. A delay flip-flop 524 has its 1- and 0-inputs respectively connected to the 0- and 1-outputs of FF–522; and, the outputs of FF–524 are, in turn, connected in inverted fashion to an advance flip-flop 526. The outputs of the latter are connected in inverted fashion to a next-request message flip-flop 528. Connected to the T-inputs of FF–522 to –528 via an inverter 532 is a 1 kc. source 530 of negative pulses. The 0-output of advance flip-flop 526 is used to develop a negative-going pulse when it is set, which pulse applied via inverter 530 is utilized as an Advance pulse on line 380 which is connected to the corresponding line in the retriever (FIG. 4) or, in an alternative mode of connection, to a plurality of data collectors, as described below.

The 0-output of advance flip-flop 526 is also applied to the trigger input of a select counter 532 which has two stages for a count of 4. The four outputs of the select counter 532 are applied in combinatorial fashion to four decoder gates 534–540 so that these four gates are successively enabled as the select counter cycles through a count of 4. The other inputs to the gates 534–540 are the Request lines 376 carrying R′–1 to –4, respectively, from the four different retrievers 42–44 (FIG. 1) which are connected to this slave output 38. The outputs of the gates 534–540 are four Select lines 340 which are connected to the corresponding four retrievers.

When a Request′ signal is received, say from the first retriever 42, the associated gate 534 is enabled when the select counter is advanced, say to a count of 0. A Select signal then appears on line 340 and is returned to the retriever–1. When the select counter advances to a count of 1, the second retriever's Request′ is passed and returned thereto as a Select signal; on a count of 2, the third retriever, on a count of 3, the fourth retriever is processed, and again on a count of 0, the first retriever's request is handled.

The four outputs of the gates 534–540 are passed by a buffer 542 to a line 544 which is connected via two cascaded isolating inverters 545 to the 1-output of FF–494. If a request is received from the retriever unit corresponding to the count of the select counter 532, the associated Select line is at a ground potential, and line 544 is at a low voltage; accordingly, there is likewise a low voltage at the output of the second inverter 545 so that there is no effect on FF–494. However, if no request signal is received from the retriever corresponding to the count in the select counter 532, all of the Select lines are low, line 544 goes high, and FF–494 is set. Accordingly, read-out flip-flop 496 is reset on the next I–1 pulse which prevents read-out from the drum. Thereby the coincidence detection and read-out operations are disabled if the selected retriever is not sending a Request′. The disabled condition continues until Request′ is received to indicate that the request message has been established in the retriever so that spurious operations that might occur on transition states are prevented.

The high signal on line 544 also resets a no-coincidence flip-flop 546, and also, via buffer 548 and inverter 550, it resets a 3-stage quadrant counter 552 which counts the quadrant pulses Q–1. Thereby, when the next Request′ signal is received, the signal on line 544 ends, and the control logic is in condition for normal operation.

The next message flip-flop 528, when reset at the end of the Advance pulse, supplies a high-level signal via inverter 558 to line 544 to set FF–494 to a condition corresponding to anti-coincidence. This signal on line 544 continues for a millisecond (until the next pulse from the source 530) so that read-out flip-flop 496 is likewise reset during this time period to prevent read-out. Accordingly, for the one millisecond period following the Advance pulse, the coincidence detection and drum read-out operation are effectively disabled which provides a suitable time for the next request message from the next retriever to become established before the next coincidence detection and read-out operation can be initiated. Thereby, spurious coincidence detection due to transient conditions is avoided.

The signal from the next-request message flip-flop resets the no-coincidence flip-flop 546 as well as the quadrant counter 552. Thus, the no-coincidence flip-flop 546 is in condition to enable gate 554 when the quadrant counter counts to 5 without coincidence being achieved. FF–522 is set by the pulse from source 530 following its reset due to the connection between its 0-output and 0-input. FF–524 to –528 are similarly restored in succession.

In order to insure that the no-coincidence flip-flop 546 is reset when the machine is first turned on, a gate 560 is provided which receives the inverted G–3 pulse together with those outputs of the quadrant counter 552 that correspond to a count of 6; at this count, the gate 560 supplies a resetting signal to the 0-output of FF–546. Accordingly, the control logic is then in condition for normal operation.

During the coincidence-detection operation, if coincidence is not detected within a full revolution of the drum, due, for example, to an improper SIC in the request, a count of 5 is registered in quadrant counter 522. This count together with the reset condition of FF–546 are effective to produce a pulse from gate 554 to set FF–546 and to reset FF–494 so as to initiate the read-out operation as though coincidence had actually been detected.

The read-out flip-flop 496 is set thereafter, and the read-register gates 500 are enabled to supply trigger pulses to the registers 502–506. The 1-output of FF–546 supplies a high signal via line 561 to buffers 514–518 to enter trains of 0-bits in the read registers. Thereby, the reply message that is returned to and displayed in the requesting console (which submitted the improper SIC) is all zeroes which indicates to the operator that the requested SIC may not be a correct one.

If the console operator should not supply a category selector in the request, upon coincidence in the slave output, the outputs of the read gates 512, 520 are all low, which has the effect of entering all 1-bits in the read registers 502–506. The resulting reply message is supplied to the decoder in the console in the usual fashion; however, the decoder is arranged to produce a display of all nine digits to remind the operator to check selector switches for an entry.

To summarize, the slave output is successively coupled to the four retrievers to process their requests. The SIC–C signals in parallel from the coupled retriever are compared with the SIC–D signals from the drum in groups of five to locate the cell of information which is requested. The selected category is then read from the proper bin and established in parallel by the read registers for return to the coupled retriever. An Advance signal is then generated to enter the reply information in the coupled retriever register and thereafter to couple the next retriever to the slave output to process its request.

*Overall operation*

The overall operation is first described in connection with the system shown in FIG. 1 utilizing the slave output 38 and then with the other form of system using the slave output 40 with the data collectors 64–68 directly connected thereto.

In the system of slave output 38, at some initial condition, one of the flip-flops in the data collector commutator (FIG. 2B) is set to the 1-state, say the first flip-flop 100. EC–1 in console #1 (FIG. 2A) is applied to the switches 80–88 with a combination of the SIC switches 80–84 closed, and one of the selector switches, say High switch 86, closed. Thereby, a parallel combination of high signals are established on the SIC′ lines 95, 96, etc. and on the High line 97 of the data collector.

The request signals from the data collector are established in parallel at the data terminus gates 200–210 by suitable cable connections. By that time, the sequencer (FIG. 3B) has supplied the signals X′–1 and Y′–1 to generate, via gates 210 and 224, the first index bit of the request message which is sent to T*x* 47. The second index bit is then supplied by gate 226; and, thereafter, the High′ bit is supplied by gate 228, and successively the remainder of the selector bits. In a similar fashion, the SIC code combination is supplied successively in serial form to T*x* 47.

The dataphone transmitter-receiver combination 47, 45 transmits the serial request message to retriever–1 (FIG. 4) which establishes the request message in the shift register 326 by means of SHA synchronously generated by counter 352. Due to the read-out flip-flop 366 being reset, Enable-Index′ is supplied to the index detector gate 364 which detects the index bits when they are received in FF–31 and –32. The gate 364 resets shift flip-flop 372 so that the 0-output thereof supplies Request′ on line 376 to the slave output 38 (FIG. 5). Request′–1 in the slave output passes gate 534 when the select counter 532 has stepped to a count corresponding to retriever–1. Gate 534 supplies Select–1 signal via line 340 to retriever–1 (FIG. 4), where it is applied in inverted form to the read-out gates 336 of the message register 326. Select–1 is maintained to continue this read-out until the requested information is obtained by the slave output.

The SIC′–C signals are applied to the gates 440–446 for comparison with the SIC–D signals being read from the drum in the anti-coincidence logic of gates 458–466 and 478–486. The outputs of the latter gates leave coincidence flip-flop 494 reset when coincidence is detected. FF–496 is then set at the beginning of the next cell location, and it initiates the read operation by enabling gates 500 at the trigger inputs of the read registers 502–506. Also at that time, the read gates 512 for the selected category "High" start to load the requested information into the read registers 502–506. This loading continues until each of the registers 502–506 receives the associated four bits of the requested cell of information. The information signals at the outputs of read registers 502–506 are immediately available in parallel (via cables) at the corresponding inputs of jam gates 382–392 in data retriever–1 (FIG. 4).

Delays in the entry of these signals into the retriever register FF–23 to –15 are provided by FF–522 and –524 in the slave output. After a delay of at least a millisecond (timed by the one kilocycle source 530), the advance flip-flop 526 is set and remains set for a millisecond to generate the Advance pulse.

The leading edge of that Advance pulse in retriever–1 resets all of the stages of message register 326. The leading edge of the Advance pulse is also used to reset the shift flip-flop 372 which removes the disabling voltage from the synchronizer counter 352 so that shift pulses may be generated and removes the request signal from the line 376. In addition, the Advance pulse resets read-out flip-flop 366 to enable the read-out gate 400 to pass the reply message when it is established.

At the trailing edge of the Advance pulse, the jam gates 382–392 enter the information bits into FF–15 to –26 of the message register 326. A half millisecond later the next shift pulse SHA is applied to the trigger inputs of the message register 326 to initiate the shift-out of information via the gate 400 to T*x* 46 of the dataphone. The first five bits of the reply message are the index bits of the reply message, and the following twelve bits are the requested information.

The reply message is transmitted via the dataphone T*x*, R*x* combination 46, 48 to the data terminus. There it is fed into the cleared reply message register 266 synchronized by the binary counter 284 generating shift pulses SA′ that are passed by gate 290 which has remained enabled since the request message was sent. When the first five bits are established in FF–8 to –12, the receipt of this index portion of the reply message is detected by gates 296–302, and a pulse is passed by gate 304 (enabled by the reset FF–306) for resetting the sequencer 233 via line 240.

When the sequencer 233 is reset, five additional shift pulses SA′ are counted therein to establish signals X′–4 and Y′–0 which are effective to reset flip-flop 292. Thereby, further shifting of the information in reply message register 266 is terminated, and the reply message information is established in parallel at the outputs of the twelve stages of that register 266.

The next shift pulse SA′ applied to the sequencer establishes the state of X′–1, Y′–1 which are applied to the gate 299 to generate the Advance pulse on line 301 which has a one millisecond duration. This Advance pulse is supplied to the data collector (FIG. 2C). At the leading edge of the Advance pulse, gate 146 applies a trigger pulse to the T-inputs of FF–130 to –136, the 12-bit console–1 register 129. Thereby, the twelve parallel information bits of the reply message are established in that register 129 from which they are supplied to the decoder and display of console–1 to present the information requested in decimal form.

At the trailing edge of the Advance pulse, the commutator 99 (FIG. 2B) is triggered to shift the 1-state to FF–102 which provides a high enabling voltage on EC–2. Accordingly, the request established on the switches of console #2 is established in the form of signals that are passed, in the manner described above, via the data collector 52, the terminus unit 50, and via the dataphone to retriever unit 42. The operation is smiliar to that described above, and when the slave output 38 has its select counter cycled back to accept the Request′ signal from retriever unit 42, the request is processed. In a similar fashion, successive console units have their requests processed until console–8 has its request processed. If only the single data collector 52 is connected in the system, the commutator 99 of the data collector cycles back to enable console–1 to have its request filled again. If the same request is still set in the switches of console–1, the identical message is transmitted, and if the information requested has not been changed on the drum, the identical reply is received. However, if, in the interim, the information has been changed on the drum, the new information is sent back in reply, and the operator can see the change take place on his console. When all eight data collectors are connected in the system, as illustrated in FIG. 1, the console cycle is through the sixty-four consoles connected therein before the cycle is returned to console–1. Likewise, and lesser number of data collectors or consoles may be connected in the system.

The operation of the portion of the system connected to the other data retrievers is similar to that described above. After the slave output has filled the request of retriever–1 and while the latter is sending out its reply message over the dataphone, data retriever–2 may have its request filled, and so on. Thereby, in the illustrated system where eight data collectors are connected to each data terminus, 256 consoles may be serviced by the slave output 38. For a drum revolution time of 35 milliseconds, about 18 milliseconds are required on the average for the slave output to obtain access to the requested information. The dataphone transmission times for the request and reply messages are 32 and 17 milliseconds. Assuming transmission delays, a reply is received by a console within 70–80 milliseconds after its request has been sent out. After sending out a reply to retriever–1, the slave output can process the requests of the other three retrievers and be ready (or almost ready) to receive the next request of retriever–1. For the large number of consoles indicated, successive requests from the same console may be processed within a matter of seconds. For a lesser number of consoles, though still large, the time for successive requests from the same console may be less than a second. Thus, each operator can rapidly monitor a large body of information independently of the other operators.

At the same time that slave–1 is receiving its signals from the read-write heads and amplifiers 26, 28, and 30, slave output–2 is likewise receiving these signals since its connections are to the same point. Thus, slave output–2 may operate to gain access to and read the same or a different information portion of the drum in response to a request without interference with slave output–1. In addition, other slave outputs (not shown) may be connected in a similar fashion with the only limitation in the number being the gain which is provided by the amplifiers 26, 28, 30. Thus, a very large number of consoles can be accommodated with a single drum. By duplicating slave drum systems, a single master source 22 is used to maintain the slave drums in updated condition, and the slaves may be located in widely separated areas to service an unlimited number of consoles.

The operation of the system of slave output–2 is described in connection with FIG. 5 (which may be assumed to be the same as slave output 40) and in connection with FIGS. 2A, B, and C (which may be assumed to be any one of the data collectors 64–66 and the associated consoles). In this case, the structure and operation of the slave output 40 is the same as that for the slave output 38 except that the select counter and associated logic is not utilized and may simply be disconnected or left operating without effect. The data collector and console structure and operation remain unchanged except that the SIC′ and selector lines of the data collector are connected directly to the gates 440–446 and to the read gates 512, 520, respectively. The INF′ lines of the data collector are connected directly to those lines at the outputs of the slave read registers 502–506, and the Advance-In line is connected to the slave Advance line 380.

Starting with console–1 the request message is established in the same manner as described above, and the outputs of the data collector in the form of SIC–C signals and category selector signals are supplied directly to the slave-output inputs for those signals. The 12-bit INF′ lines from the slave output are returned to the corresponding INF′ inputs 140 of the data collector (FIG. 2C); thus, the information signals are returned directly to the data collector without the intermediary of the retriever and data terminus system. The one millisecond Advance pulse is provided by the slave output in proper relation for the operation of the data collector. In other respects, the operation of the system is the same as described above.

In the system of slave output 38, when the power is initially turned on, the retrievers immediately generate Request′ signals (due to the resetting of FF–372 by circuit 410, 412, FIG. 4). Thereby, all of the retrievers are available to be coupled one at a time to the slave output as the select counter thereof determines. Accordingly, the salve output to perform the drum-read and read-out operations even if the request message that may be stored in the retriever register 326 is a false or spurious one. The effect, however, is that the slave output generates a reply message that is transmitted down the system to synchronize the operation of the parts of the system. The initial reply message may be a garbled one, but any display that it produces is only momentary. If a true request is initiated from a console at the same time, it is overridden by the reply-message operation in the various parts of the system, and the latter operation determines the timing of succeeding operations.

In the system of slave output 40, the data collectors are effective to enable a console to initiate a request when the power is turned on. In addition, the slave output 40 is effective to send a reply message and Advance pulse (by operation of the quadrant counter 552 and FF–546) if a timely request message is not received.

In the system of slave output 38, the four second detector 410 in each retriever ensures that cycling of the slave output is not blocked by some failure in one of the retrievers or its associated sub-system. The four second detector 294 in the data terminus ensures that the latter's register 266 is able to receive the pseudo-reply message generated by the detector 410 in the associated retriever. Thereby, momentary failures that may produce stalled sub-cycles of the equipment are automatically corrected.

*Modified data collector and console logic*

In FIG. 12 a modified form of data collector is illustrated; in this data collector the connections for the Request signals from the consoles are generally the same as illustrated in FIG. 2A (and therefore are not illustrated in FIG. 12). In place of the sequencer of FIG. 2B, a modified form is shown in FIG. 12A, and in place of the storage registers of FIG. 2C, a storage register system is provided in the console logic as illustrated in FIG. 13 with connections thereto from the data collector (FIG. 12B).

The sequencer 700 (FIG. 12A) includes a 3-stage X-register connected as a recirculation register; the construction is similar to that described above except that there is an inversion in the connections between the first and second stages. Output signals X′–1, X′–2, X′–3 are derived from the 1-, 0-, and 0-outputs of FF–702, –704, –706, respectively. The 1-output of FF–706 is also connected via an inverter 708 to the T-inputs of the three flip-flop stages 710–714 of a Y-register, which is connected as a shift register in the same fashion as the X-register 700 except that no recirculation is provided, and the 0-input of FF–710 is grounded. Y′–1 to –3 outputs are derived from the stages in the same fashion as the X′ outputs are derived, and, in addition, Y–1 to –3 outputs are derived from the other output terminals.

The Advance-In line 301 is connected via inverter 110 to the T-inputs of the X-register 700. In addition, the output of the inverter 110 is connected via another inverter 112 to the Advance-Out line in a manner similar to that described above in FIG. 2B.

In effect, FF–702 is initially in the 1-state, and three successive Advance' pulses transfer that state in a complete cycle in the X-register. Upon the completion of the X-register cycle, a trigger pulse is supplied to the Y-register 716. Assuming that the Y-register is reset initially, the outputs of FF–710 are derived as though the latter is set. Upon completion of the first X-register cycle, FF–712 is set by the trigger pulse, and the state of FF–710 is reversed; after the second X-register cycle, FF–712 is reset, and FF–714 is set, and after the third X-register cycle, FF–714 is reset. Thus effectively, by combining the outputs of the X- and Y-registers, a sequential count of 9 is provided.

This 9-count is recognized by a gate 718 which receives the Y–1 to –3 signals and supplies a gating pulse via an inverter 720 with a pulse-stretching capacitor 722 connecting the base thereof to ground. The gating signal is supplied to gate 724 together with the Zero'-In signal and the output thereof is applied via switch 126 and inverter 726 to the R-inputs of the X- and Y-registers 700 and 716. A 9'-In line is connected to one contact of switch 114, and ground is connected to the other contact thereof. (Switch 114 is operated in the same manner as switch 114 of FIG. 2B, but different signals are applied to the contacts thereof.) The pole of switch 114 is connected via an inverter 726 also to the R-inputs of register 700 and 716. A gate 728 receives the X'–3 and Y'–3 signals and supplies, via inverter 730, a signal to a line 9'-Out. Gates 729 and 731 respectively receive the X' and X signals and also have their outputs connected to inverter 722, and operate respectively to reset the X and Y registers 700, 716 when the X register spuriously acquires three 1-bits or loses its 1-bit.

In operation, the switches 114 and 126 are illustrated in FIG. 12A in the position used for the first data collector in a string, in a manner similar to that described above. For succeeding data collectors the switches 114 and 126 are connected to the opposite position. Ground applied via switch 114 is inverted to a low voltage which has no effect on the reset line. When a count of 9 is completed in the X- and Y-registers as indicated by all the Y signals being low, gate 718 supplies a pulse via switch 126 to reset all of the stages of the sequencer 700 to the initial condition.

Gate 728 is used to recognize the condition of 9 in the registers to provide a 9'-Out signal for use by the succeeding data collector, when employed. This 9'-Out line is connected to the 9'-In line of that succeeding data collector (the switches 114 and 126 being moved to the opposite position), and the 9'-In signal is effective to reset the X- and Y-registers of that succeeding data collector and thereby establish a count of 1 therein. Also, the Zero'-Out line of the second data collector is connected to the Zero'-In line of the first data collector to enable the first data collector to reset its sequencer 700 when a count of 9 has been established in both data collectors.

The Advance' signal from inverter 110 is also supplied to eight gates 732–746, which respectively receive different combinations of an X' and Y' signal representing the different counts of 1–8 established in the X- and Y-register 700, 716. The outputs of the gates 732–746 are Store–1 to –8 signals that are respectively supplied to the eight consoles. Thus, in the initial reset condition of the register 700, 716, X'–1 and Y'–1 are both low to develop a Store–1 pulse via a gate 732, and so on with the Store–8 pulse being developed in gate 746 at the count of 8 represented by X'–2 and Y'–3.

A gate 748 receives the X'–1 and Y'–1 signals to develop the EC-1 pulse that is applied to console #1. In a similar fashion, seven other gates (not shown) receive combinatorial X' and Y' signals that are the same as those into gates 734–746 to develop, respectively, the EC–2 to –8 signals for the associated console. The utilization of the EC–1 to –8 signals at the switches of the consoles is the same as that described above for FIG. 2A.

The INF'–1 signal (FIG. 12B) is applied to an inverter driver 750, the output of which is connected to a line 752 which is an input line for console #1. Seven other lines 754 are also connected to the output of inverter 750, and these lines are respectively connected to the corresponding INF–1 input lines of consoles #2–7. The output of inverter 750 is also connected to the input of another inverter 756 which supplies the INF'–1-Out signal; the INF'–1-Out line is connected to the INF'–1-In line of the succeeding data collector when one is employed.

Eleven other circuits similar to the circuit 750–756 are provided (as indicated by the broken line between gate 750 and the corresponding gate 758 for INF'–12) which respectively receive the INF'–2 to –12 signals and distribute them to the different consoles and also provide connections for the signals to be passed on to succeeding data collectors, all in a manner similar to that described for the circuit 750–756.

The data collectors of FIG. 12 are formed as modular units in a manner similar to those of FIG. 2, and these units are readily connected together or disconnected. The cascading of the units requires the connection of the SIC and selector-line terminals of the second data collector to those of the first; the connection of the Zero'-Out terminal and 9'-Out terminals of the second to corresponding In terminals of the first together with proper setting of the switches 114 and 126; the connection of the INF'-In and Advance-In terminals of the second to the corresponding Out terminals of the first; and the connection of ground terminals. These connections are made by a single cable coupling between data collectors. Similarly, a single cable coupling is provided from a data collector to each console.

In FIG. 13, the logic and circuitry in the console for decoding and registering the information signals and displaying the information are illustrated. FIG. 13 represents the circuitry for console #1; that for the other consoles #2–7 is the same in construction and operation, except that the associated Store–2 to –7 signals are supplied thereto.

The Store–1 pulse of line 747 is applied to an amplifier and pulse-forming circuit comprising three transistors 760, 762, 764, the first two of which function to reshape the 1-millisecond Store pulse which may have degenerated as a result of transmission through a long cable. The coupling of capacitor 766 and resistor 768 between the second and third transistors differentiate the Store pulse, and transistor 764 squares the pulse to generate a short pulse occurring at the leading edge of the Store pulse. Transistors 760 and 762 are direct-coupled and respectively normally on and normally off. At the leading edge of the Store pulse transistor 760 is cut off; transistor 762 comes on quickly to drive the differentiating circuit and turn off transistor 764, which supplies a negative-going pulse to line 770.

The information display is by means of a cold cathode neon display tube 772 which has ten cathodes respectively formed as the decimal characters 0–9, and an anode 774 which is returned to a positive direct supply. If any one of the cathodes is held at a voltage substantially below the anode, it glows and presents a display of its decimal character to the operator.

A beam switch tube 776 comprises ten targets 778, respectively connected to the 0–9 display tube cathodes 773. Ten spades 780 are individually associated with the target 778, and the spades and targets are arranged at equal intervals around the tube surrounding the cathode 782 thereof. Also associated with each combination of a spade and target is a grid; all of the even grids are connected together as are all of the odd grids, and they are brought out at two points *Ge*, *Go*, which designate grid-even and grid-odd. A shield grid 784 is used to stabilize the tube 776.

This switch tube 776 has eleven stable states; one is with no beam formed to the targets 778, in each of the other ten, the beam is formed to a different one of the ten targets. The tube 776 also has a magnet which generates a magnetic field perpendicular to the electric field to cause electrons to leave the cathode and follow equal potential to one of the spades 780. The cathode 773 is at ground potential so that if one of the spades 778 is lowered to ground potential, the beam forms to that spade.

The beam is switched or stepped from one position to another in two ways: In one, the beam is initially formed at any one spade (the locked spade), then the beam is stepped to any one of the spades that lead it (that is, a spade which is up to five positions in advance of the lock spade) by lowering the potential of the leading spade. The other is by lowering the potential of the grid associated with the locked spade, in which case the beam is stepped to the next leading spade. Thus, if the beam is formed to the target 780 is position–1 and the spade 778 in position–2, –3, –4, –5, or –6 is grounded, the beam switches to the target of the grounded spade; or if the beam is formed in any even-numbered position and the even grids G*e* are driven negative, the even-numbered position becomes unstable, and the beam switches to the next target. The tube has the characteristic that the beam advances in one direction from target–1, and lowering the spades 7, 8, 9, or 0 (defined as lagging spades) has no effect on the beam at target–1.

Connected from the line 770 is a transistor amplifier 786 in the common-emitter mode which is biased on, the collector of which is connected to the cathode 782 of the switch tube. The collector of transistor 786 is also capacitor-coupled to spade–0, and also capacitor-coupled to transistor 788 (of the PNP type) which is operated in the avalanche mode to furnish a path for the emitter current of four input switch transistors 790–796 (NPN). The emitter of transistor 788 is returned to a positive voltage source via resistors 798 and 800, the junction of which is a bus 806 that is at a positive voltage during conduction thereof.

Transistors 790–796 receive the INF–1 to –4 signals respectively at their bases, which signals tend to turn the transistors on. Transistor 790 has its collector returned to a large positive voltage via resistor 802, and its collector is capacitor-coupled directly to the even grids G*e* and via resistor 804 to bus 806. The bus 806 is directly connected to the odd grids G*o* and via separate resistors to spades–0, –1, and –9 and via separate resistors to the collectors of transistors 792–796. The collectors of transistors 792–796 are connected directly to lines 810, 814, and 818, respectively. Spades–2 and –6 are connected via separate resistors to line 810; spades–4 and –6 via separate resistors to line 814; spades–3, –5, –7, and –8 via separate resistors to line 818.

Also connected to the line 770 is a second decoder, register and display unit 820 which receives the information signals INF–5 to –8, and a third decoder, register and display unit 822 which receives the information signals INF–9 to –12. These units 820 and 822 are generally the same in construction and operation as the unit 785 that receives the first four information signals, and the operation of these units 820 and 822 will be apparent from the following description of unit 785.

In operation, the information signals INF–1 to –4 are established at the bases of transistors 790–796, respectively, and then a Store–1 pulse is applied to line 747 to generate a narrow negative pulse to turn off transistor 786. A large positive-going voltage pulse at the collector 786 raises the voltage of cathode 782 higher than the spade voltages, and the tube 782 is cleared, as is any display of tube 772. At the end of the pulse on line 770, transistor 786 is turned off, and a large negative voltage step at its collector is passed by the capacitor and applied to spade–0. Thereby voltage on spade–0 is reduced, and the beam is formed in position–0. Simultaneously, this negative step of transistor 786 is applied to the base of transistor 788 to cause this transistor to conduct and furnish a path for the emitter current of any of the transistors 790–796 turned on by the information signals and to establish a positive voltage on the bus 806.

The beam is switched to a position determined by the combination of information signals supplied to the transistors 790 and 796. After a time, determined by the time constant of the capacitor circuit at the input to transistor 788, the information signals may be removed without affecting the beam position; that is, the ultimate position of the beam stores the decimal representation of the binary information signals.

The decoding of the information is as follows: If all of the information signals are 0-bits, none of the transistors 790–796 conduct, and the beam remains at target 778 to produce "0" display. If INF–1 is "1" (also representing decimal 1), only transistor 790 is turned on, and it couples a long pulse through the transistor at its collector to G*e*. This causes the beam at position–0 (an even position) to step one place to position–1. If INF–2 is the only 1-bit, transistor 792 conducts to bring spade–2 substantially to ground, and the beam is formed in position–2. Transistor 792 also lowers the voltage at spade–6 but by an amount insufficient to cause the beam to step to this leading position. Similarly, transistor 794 receiving INF–3 (representing decimal 4) steps the beam to position–4 and does not lower the voltage sufficiently at spade–6 to cause the beam to step further. Transistor 796 receiving INF–4 (representing decimal 8) pulls down the spades associated with positions–3, –5, –7, and –8 to cause the beam to step successively through these positions and form finally at position–8. If, in addition to one of the transistors 792, 794, 796 (representing decimal 2, 4, 8), transistor 790 is also turned on (representing decimal 1), the point G*e* is driven negative to make any one of these even positions unstable to cause the beam to step to the next odd position. When transistors 792 and 794 are turned on (representing decimal 2 and 4), the beam is stepped to position–2 by line 810 being lowered, and to position–4 by line 814 being lowered, and finally to position–6 by the combination of lines 814 and 810 being lowered. If transistors 790, 792, and 794 are all turned on (representing decimal 1, 2, and 4), the beam is stepped to position–6 in the manner described above, and due to the even grids being lowered by transistor 790 being zero, the beam is stepped one more step to position–7.

Thus, the information is effectively decoded by the transistor circuits and the beam-switch-tube (776) operation. The latter also functions as a decimal register to store the decoded decimal digit. The display tube 772 provides a visual display of the stored decimal digit.

The units 820 and 822 are likewise effective to decode, register and display the decimal information represented by information bits INF–5 to –8 with the same binary values being given to those bits as to the bits INF–1 to –4. Likewise, the operation of unit 822 is also the same. Thus, these three units 785, 820, and 822 are effective to convert the twelve binary coded decimal information bits to three individual decimal numbers representing those bits. By appropriate positioning of the display tube 772 and the corresponding tube units 820 and 822, the proper three decimal digit display of the requested information is provided.

*Slave output modification*

In FIG. 11 a modification of the slave output system is illustrated which functions to restrict the access to the drum storage for certain consoles.

Two sets of three read gates 650 and 652 are used (like the read gates 512 and 520 of FIG. 5) to read the Bid and Ask signals from the Bid and Ask bins 654 and 656, respectively, of the drum memory 20. These gates 650 and 652 are enabled by the B and A selector signals supplied via inverters 658 and 660, respectively. The outputs of the gates 650 and 652 are connected to the buffers 514–518 (FIG. 5), respectively, in a manner similar to the outputs of the gates 512 and 520. The outputs of the inverters 658 and 650 are connected via inverters 662 and 664, respectively, to a buffer 668, and the output thereof is applied as one input of gate 670.

An additional track 671 on the drum 20 is associated with the SIC bin 32 as a sixth track thereof; the four bits in track 671 of each SIC cell provide SIC 21–24 for each stock identifier. Track 671 is read by a read-write recording head and amplifier 672, the output of which is applied via inverter 674 as signal SIC′–D–21 to –24 to the input of gate 670.

A third input to gate 670 is the output of buffer 676 the inputs of which are connected to terminals G*x*, G*y*, and G*z*. A fourth input to the gate 670 is a Request′ signal R′–1 from the first data retriever. A gate 678 receives as inputs the R′–1 signal, the signal SIC′–D–6, and the output of a buffer 680 which is connected at its inputs to the terminals G*a*, G*b*, and G*c*.

The G terminals at the inputs to buffers 676, 680 are in a connector box 682 that has four input terminals that respectively receive the G–1 to –4 timing signals (FIG. 10), which respectively correspond to the bits 21–24 of each cell in track 671. The outputs of gates 670 and 678 are applied to the buffer 490 in the slave output anti-coincidence circuit (FIG. 5).

The gates 670 and 678 and connector box 682 form a unit 684 enclosed in broken lines, which unit is associated with the first retriever. A second such unit 686 is constructed in the same manner as unit 684 and receives the same inputs except that it receives R′–2 from the second retriever instead of R′–1; third and fourth such units (not shown) receive R′–3 and –4, respectively. The outputs of unit 686 and the others are also connected as inputs to the buffer 490.

In the connector box 682, jumper lines are selectively connected from any of the G–1 to –4 input terminals to the G*x*–G*z* and G*a*–G*c* output terminals. By way of illustration a jumper line 688 is connected from the G–1 input terminal to G*x*, a line 690 from G–2 to G*y*, a line 692 from G–3 to G*a*, and a line 694 from G–4 to G*b*.

In operation, for each stock identifier SIC–1 to –20 in bin 32, a coded bit combination is provided in the associated SIC 21–24 (track 671) to identify that stock within a certain class; for example, the class may be that of the exchange from which it originated, or some other category. Thus, by way of example, if the stock identifier originated from the first, second, third, or fourth exchange, a 1-bit is provided in bit positions 21, 22, 23, or 24, respectively, in the same cell as that stock identifier.

Assume that one of the consoles associated with retriever–1 requests price information about a stock on exchange #3 which is identified by a 1-bit in position 23 in track 671. The coincidence detection process described above in the slave output (FIG. 5) starts to operate in the same manner to locate the cell for the requested SIC signals. However, when recording head and amplifier 672 reads bit position 23 associated therewith, a 1-bit is read which is applied in inverted form to gate 678. At the same time, R′–1 from retriever–1 is available and applied to gate 678. In addition, at the same time, G–3 (corresponding to bit position 23) is applied via jumper 692 to G*a*, and via inverter 680 to an input of gate 678. All of the inputs of gates 678 being low, it supplies a high signal to buffer 490 which, as described above for FIG. 5, is effective to set coincidence flip-flop 494 to inhibit the readout process. Thus, none of the consoles associated with retriever–1 is able to gain access to stock information associated with the third exchange. In a similar fashion, due to the jumper 694 from G–4 to G*a*, none of the consoles in retriever–1 can gain access to stock information associated with the fourth exchange. In practice, any of the G–1 to –4 inputs may be connected by jumper lines as illustrated to the G*a*–G*c* terminals to limit the access of the console (retriever–1) to one or more of the exchanges. Thus, these consoles of retriever–1 may obtain access to any class of information stored on the drum except those classes associated with the G–1 to –4 signals that are supplied by jumpers to the G*a*–G*c* terminals (and except for a further restriction provided by the jumper lines to terminals G*x*–*z*).

When one of the consoles of retriever–1 requests a Bid or Ask price associated with exchanges–1, the B or A selector signal supplied to inverter 658 or 660 is further inverted in inverter 662 or 664 and in buffer 668 and applied to gate 670 as the B′ or A′ signal. Gate 670 also receives the R′–1 and SIC–D–21 to –24 signals as well as the G′–1 or G′–2 signals from buffer 676 (due to jumper 688). Accordingly, gate 670 has all its inputs at a low voltage and supplies a high voltage level to buffer 490 to set the coincidence flip-flop 494 and prevent read-out. Thus, any of the consoles associated with retriever–1 is restricted from gaining access to the subclasses of information of Bid and Ask prices derived from the first exchanges. The jumper 690 similarly prevents access to the Bid and Ask prices of the second exchange. For the illustrated connection of jumper lines 688–694, the only information that retriever–1 consoles may obtain is the information associated with exchanges #1 and 2 that is not Bid and Ask information.

Any one of the G–1 to –4 inputs associated with the four different exchanges may be connected to the G*a*–*c* terminals to restrict, in its entirety, access to the information associated with that exchange, and it may be connected to any one of the G*x*–*z* terminals to restrict access to the subclass of information or subclasses of information whose selector signals are supplied to gate 670 (Bid and Ask being presented by way of illustration).

In a similar fashion, the consoles associated with retriever #2 may be restricted by the control of unit 686. The connector box 682 of that unit 686 may be arranged to provide an entirely different set of limitations from the limitations in unit 684; or, for example, there may be no limitations placed on the service of the consoles of retriever #2. The restrictions on each retriever are independent of each of the others. In a similar fashion, the control units (not shown) for the other retriever units may be independently set in a similar manner.

If all of the consoles associated with a slave unit are to be given the same restrictions, only the unit 684 is required, and the connection from the request line R′–1 is disconnected. Thereby, any request coming in from any console is monitored by the unit 684 and restricted in the manner described above.

The system of this invention provides a new and improved arrangement for retrieving information, particularly stock information, from a memory and for coupling a large number of operator consoles to the memory. The various parts of the system operate independently to perform different functions and cooperatively as a unitary system. The system is adapted for long distance or nearby communication with the memory. The consoles may be readily connected individually and in groups into the system without disruption thereof.

Various modifications of the system and its parts and features will be apparent to those skilled in the art. The invention is not limited in its scope except as set forth in the accompanying claims.

What is claimed is:

1. A data retrieval system which comprises (a) a cyclic memory for storing data, (b) display units each including means for producing request signals, means for receiving replies thereto and means for displaying said replies, (c) a plurality of data collector-terminus means each having a plurality of said display units connected thereto, (d) a plurality of data retrieving means, (e) a plurality of communication means connecting respective data collector-terminus means and data retrieving means for transmission in both directions therebetween, (f) each data collector-terminus means including means for receiving request signals from said display units and means for transmitting corresponding request messages to the respective data retrieving means, (g) each data retrieving means including means for storing request messages received thereat, (h) memory output means having said plurality of data retrieving means connected thereto, (i) said memory output means including means responsive to request messages from said data retrieving means for obtaining corresponding reply data from said memory and means for supplying the reply data to the requesting data retrieving means, (j) sequencing means responsive to the supplying of reply data to one data retrieving means for enabling the next data retrieving means to supply a request message to the memory output means and receive reply data therefrom, (k) each data retrieving means including means for storing reply data and means for transmitting a corresponding reply message to the respective data collector-terminus means, (l) means at each data collector-terminus means for supplying reply data in a reply message to the requesting display unit, (m) and sequencing means for enabling the display units connected to each data collector-terminus means in succession for the transmission of requests and receiving replies thereto.

2. A system in accordance with claim 1 including means at each data retrieving means responsive to the receipt of a request message thereat for producing a ready signal, the first-mentioned sequencing means including a sequence signal generator for producing signals in predetermined sequence for respective data retrieving means, and means responsive to the sequence signal for a given data retrieving means and a ready signal therefrom for supplying the corresponding stored request message to said memory output means.

3. A system in accordance with claim 2 including means responsive to the supplying of reply data by said memory output means for actuating said sequence signal generator to produce the next sequence signal.

4. A system in accordance with claim 2 including means for sending predetermined distinctive reply data to a data retrieving means after a predetermined interval in the corresponding sequence interval in the absence of a ready signal therefrom.

5. A system in accordance with claim 2 including means responsive to the absence in the memory of the requested data for sending predetermined distinctive reply data to a data retrieving means.

6. A system in accordance with claim 2 including a reply register in said memory output means having a plurality of stages for receiving reply data from said memory, a reply register in each of said data retrieving means having a plurality of stages, means in said memory output means for producing an advance signal pulse after the reply register therein has received said reply data, and means actuated by said advance signal pulse for delivering said reply data in parallel from the stages of the memory reply register to respective stages of the reply register in the requesting data retrieving means, said advance signal pulse being supplied to said sequence signal generator to produce the sequence signal for the next data retrieving means.

7. Apparatus in accordance with claim 1 in which the last-mentioned sequencing means includes a shift register having a plurality of recirculating stages settable to display unit enabling and non-enabling states, means for successively shifting said register to transfer the states of preceding stages to succeeding stages, detection means for detecting the absence of an enabling state in any of said recirculating stages, and means responsive to said detection means for setting one of said stages to said enabling state.

8. A system in accordance with claim 7 including means for initially setting one of said recirculating stages to said enabling state and the others to a non-enabling state, said detection means being supplied with an output from each of said recirculating stages, and means responsive to an output of said detector means corresponding to all stages being in a non-enabling state for re-establishing said initial setting.

9. Apparatus in accordance with claim 6 including an elapsed time detector in each of said data retrieving means actuated by advance signal pulses supplied thereto, said detector yielding an output in the absence of an advance signal pulse for a predetermined interval after the occurrence of a said pulse, and means responsive to the detector output for producing said ready signal.

10. A data retrieval system which comprises (a) a cyclic memory for storing data, (b) display units each including means for producing request signals, means for receiving replies thereto and means for displaying said replies, (c) means responsive to a said request signal for obtaining corresponding reply data from said cyclic memory and means for supplying the reply data to the requesting display unit, (d) a shift register for enabling said display units in sequence, (e) said shift register having a plurality of recirculating stages settable to display unit enabling and non-enabling states, (f) means for successively shifting said register to transfer the states of preceding stages to succeeding stages, (g) detection means for detecting the absence of an enabling state in any of said recirculating stages, (h) and means responsive to said detection means for setting one of said stages to said enabling state.

11. A system in accordance with claim 10 in which the number of recirculating stages in said shift register is at least equal to the number of display units, said detection means is supplied with an output from each of said recirculating stages, the initial stage of the shift register is steered toward its non-enabling state, and the output of said detector means corresponding to all stages being in a non-enabling state is utilized to set said initial stage to said enabling state.

12. A system in accordance with claim 10 including means for initially setting one of said recirculating stages to said enabling state and the others to said non-enabling state, said detection means being supplied with an output from each of said recirculating stages, and means responsive to an output of said detector means corresponding to all stages being in a non-enabling state for re-establishing said initial setting.

13. A system in accordance with claim 12 including detection means supplied with an output from each of said recirculating stages for producing a distinctive output when all stages are in an enabling state, and means for utilizing said distinctive output for re-establishing said initial setting.

14. A system in accordance with claim 12 including a plurality of non-recirculating shift register stages and means for initially setting one stage thereof to said enabling state and the others to said non-enabling states, means responsive to each cycle of operation of said recirculating stages for shifting said non-recirculating stages, means for combining outputs of the recirculating stages and outputs of the non-recirculating stages in different combinations to yield enabling signals for said display units, and means responsive to a predetermined combination of states of the non-recirculating stages for re-establishing said initial settings of the recirculating and non-recirculating stages.

15. A system in accordance with claim 14 including detection means supplied with an output from each of said recirculating stages for producing a distinctive output when all recirculating stages are in an enabling state, and means for utilizing said distinctive output for re-establishing said initial settings of the recirculating and non-recirculating stages.

16. A data retrieval system in accordance with claim 1 in which said cyclic memory stores a plurality of categories of coded information concerning stocks and associated coded multi-character identifications of the respective stocks, said display units produce request signals including said coded multi-character stock identification and desired category, said memory includes a coded class identification section associated with said multi-character identifications for classifying the stocks in a plurality of different classes, and said memory output means includes coincidence means, readout means and class inhibiting means, said coincidence means being supplied with coded multi-character stock identification signals from a request unit and from said cyclic memory to determine coincidence therebetween, said readout means being responsive to said coincidence and to the category signal from a request unit for supplying the desired information to a request unit, and said class inhibiting means being responsive to category signals from a display unit and to signals from said class identification section for inhibiting the supplying of requested information in a said class.

17. A stock information retrieval system which comprises (a) a cyclic memory for storing a plurality of categories of coded information concerning stocks and associated coded multi-character identifications of the respective stocks, (b) display units each having means for producing request signals including said coded multi-character stock identification and desired category, means for receiving replies thereto and means for displaying said replies, (c) coincidence means supplied with coded multi-character stock identification signals from a request unit and from said cyclic memory to determine coincidence therebetween, (d) readout means responsive to said coincidence and to the category signal from a request unit for supplying the desired information to a request unit, (e) a coded class identification section in said cyclic memory associated with said multi-character identifications for classifying the stocks in a plurality of different classes, (f) and inhibiting means responsive to category signals from a display unit and to signals from said class identification section for inhibiting the supplying of requested information in a said class.

18. A system in accordance with claim 17 in which said coded class identification section has successive bit positions for bits identifying different classes, and including means for generating inhibiting signals synchronized with said bit positions, said inhibiting means including means responsive to the simultaneous occurrence of said category and class identifying bit signals for the respective identified stock and to the corresponding inhibiting signals for inhibiting the supplying of requested information in the corresponding class.

References Cited by the Examiner

UNITED STATES PATENTS

| | | | |
|---|---|---|---|
| 2,202,393 | 5/1940 | May et al. | 340—152 |
| 2,264,052 | 11/1941 | Quinby | 340—152 |
| 2,946,986 | 7/1960 | Harrison | 340—172.5 X |
| 2,985,835 | 5/1961 | Stuart | 328—37 |
| 2,988,701 | 6/1961 | Clapper | 328—37 |
| 3,082,402 | 3/1963 | Scantlin | 340—152 |
| 3,133,268 | 5/1964 | Avakian et al. | 340—152 |

NEIL C. READ, *Primary Examiner.*

L. HOFFMAN, P. XIARHOS, *Assistant Examiners.*